United States Patent
Sumiyoshi et al.

(10) Patent No.: US 6,667,776 B1
(45) Date of Patent: Dec. 23, 2003

(54) VIDEO SIGNAL PROCESSOR

(75) Inventors: Masatoshi Sumiyoshi, Kanagawa-ken (JP); Naoki Mazda, Kanagawa-ken (JP); Hitoshi Kawabata, Kanagawa-ken (JP); Seiichi Tanaka, Kanagawa-ken (JP); Kazumasa Ikeda, Kanagawa-ken (JP)

(73) Assignee: Kabushiki Kaisha Toshiba, Kawasak (JP)

( * ) Notice: Subject to any disclaimer, the term of this patent is extended or adjusted under 35 U.S.C. 154(b) by 0 days.

(21) Appl. No.: 09/093,876

(22) Filed: Jun. 9, 1998

(30) Foreign Application Priority Data

Jun. 9, 1997 (JP) .......................................... P09-150814
Sep. 29, 1997 (JP) .......................................... P09-264363

(51) Int. Cl.[7] ................................................ H04N 9/78
(52) U.S. Cl. ...................................................... 348/669
(58) Field of Search ................................ 348/665, 667, 348/669, 668; H04N 9/78

(56) References Cited

U.S. PATENT DOCUMENTS 5,231,476 A    7/1993    Mawatari et al.

FOREIGN PATENT DOCUMENTS

| JP | 61-147697 |   | 7/1986 |
| JP | 1-132290  | * | 5/1989 |
| JP | 4-347991  |   | 12/1992 |

* cited by examiner

Primary Examiner—David E. Harvey
(74) Attorney, Agent, or Firm—Pillsbury Winthrop LLP

(57) ABSTRACT

A video signal processor, having an input receiving unit for selectively receiving either of a baseband video signal and a composite video signal are selectively input as an input video signal thereto, a 1H delay unit for delaying the selected input video signal by one line period (1H), an inter-line non-correlation component extractor for extracting inter-line non-correlation components between the input video signal and the 1H delay signal from the 1H delay unit, an inter-frame non-correlation component remover for removing inter-frame non-correlation components from the selected input video signal, a first subtractor responsive to the selection of the baseband video signal for subtracting the inter-line non-correlation component from the baseband video signal processed the inter-frame non-correlation component removal at the inter-frame non-correlation component removing means to result noise-reduced baseband video signals, a second subtractor responsive to the selection of the composite video signal the inter-line non-correlation component from the input composite video signal to result a first luminance signal, and a mixer for mixing a second luminance signal resulted from the inter-frame non-correlation component removal at the inter-frame non-correlation component remover with the first luminance signal from the second subtractor at a ratio defined by a motion signal to result a motion-adaptively processed luminance signal.

6 Claims, 15 Drawing Sheets

VIDEO SIGNAL PROCESSOR

FIELD OF THE INVENTION

The present invention generally relates to a video signal processor.

BACKGROUND OF THE INVENTION

Conventional video signal processors have separately a noise reduction (hereinafter referred to as NR) circuit for a baseband video signal supplied by reproducing a video tape and a luminance/chrominance separation (hereinafter referred to as Y/C separation) processing circuit.

Referring now to FIGS. 1 and 2, a conventional video signal processor will be briefly described.

FIG. 1 shows a conventional NR processing circuit adapted for processing such baseband video signals. While, FIG. 2 shows a conventional inter-frame non-correlation component removing circuit for performing a motion-adaptive Y/C separation for such composite video signals.

A baseband video signal reproduced by VTRs, laser disc players and the like is supplied to an input terminal 101. The baseband video signal is supplied to an A/D converter 103. The A/D converter 103 converts the input video signal in an analog format into a corresponding digital format signal. Then following video signal processing will be carried out in digital manner. Thus if the following video signal processing is carried out in a analog manner, the A/D converter 103 will be deleted. The video signal in this stage will be referred to as a 0H video signal hereinafter for distinguishing from other video signals as described later.

The 0H video signal is supplied to a first line memory 105. The first line memory 105 delays the 0H video signal by one line period. The delayed video signal will be referred to as a 1H video signal hereinafter. The 1H video signal is supplied to a second line memory 107.

The second line memory 107 delays the 1H video signal by additional one line period. The delayed video signal from the second line memory 107 will be referred to as a 2H video signal hereinafter.

The 0H video signal, the 1H video signal and the 2H video signal are processed by band-pass filters (BPFS) 109, 111 and 113 for extracting a prescribed frequency band with a center frequency of a 7.16 MHz, respectively.

The 0H video signal, the 1H video signal and the 2H video signal each having the prescribed frequency band are supplied to a common inter-line non-correlation component extractor 115 for extracting a non-correlation component among the three video signals. The extracted inter-line non-correlation components are then supplied to a gain adjuster 117.

The gain adjuster 117 adjusts the gain of the inter-line non-correlation component.

The output of the gain adjuster 117 can be assumed as a noise component. The output of the gain adjuster 117 is thus subtracted from the 1H video signal at the subtractor 119 for obtaining an NR processed signal. The NR processed video signal is output through an output terminal 121.

In the conventional inter-frame non-correlation control circuit as, as shown in FIG. 2, a composite video signal in a form of an NTSC system recorded video signal is input to an input terminal 201. The composite video signal is then supplied to an A/D converter 203. The A/D converter 203 converts the input video signal in an analog format into a corresponding digital format signal. The video signal in this stage will be referred to as a 0H video signal hereinafter for distinguishing from other video signals as described later.

The 0H video signal is supplied to a first line memory 205. The first line memory 205 delays the 0H video signal by one line period. The delayed video signal will be referred to as a 1H video signal hereinafter. The 1H video signal is supplied to a second line memory 207.

The second line memory 207 delays the 1H video signal by additional one line period. The delayed video signal from the second line memory 207 will be referred to as a 2H video signal hereinafter.

The 0H video signal, the 1H video signal and the 2H video signal are processed by band-pass filters (BPFS) 209, 211 and 213 for extracting a prescribed frequency band with a center frequency of a 3.58 MHz or a color sub-carrier frequency, respectively.

The 0H video signal, the 1H video signal and the 2H video signal each having the prescribed frequency band are supplied to a common inter-line non-correlation component extractor 215 for extracting a non-correlation component among the three video signals. The extracted inter-line non-correlation components are then supplied to an adder 228 through the non-linear filter 227, and wherein the inter-line non-correlation components are added with three-dimensional chrominance components C3 as described later. Then the added signal is supplied to a subtractor 219.

The subtractor 219 subtracts the output signal of the non-linear filter 217 from the 1H video signal. Thus a two-dimensional luminance signal Y2 is obtained from the subtractor 219 and then supplied to one input terminal of a mixer 223.

The 1H video signal is also supplied to an inter-frame non-correlation signal remover 225 wherein the inter-frame Y/C separation is performed on the 1H video signal. A three-dimensional luminance signal Y3 is thus obtained from the inter-frame non-correlation signal remover 225 and supplied to another input terminal of the mixer 223. While a three-dimensional chrominance signal C3 obtained from the inter-frame non-correlation signal remover 225 is supplied to another input terminal of the adder 228, and wherein the three-dimensional chrominance signal C3 is added with the above-mentioned inter-line non-correlation components.

The mixer 223 mixes the two-dimensional luminance signal Y2 from the subtractor 219 and the three-dimensional luminance signal Y3 from the inter-frame non-correlation component remover 225 in the ratio defined by a motion signal which is obtained separately as described later. A mixed luminance signal Y is output through an output terminal 227.

Such a conventional NR circuit, as shown in FIG. 1, and such a conventional Y/C separation circuit, as shown in FIG. 2, are individually dedicated for a sole use of the NR and the Y/C separation. Thus VTRs must incorporate independent units of such an NR circuit and a Y/C separation circuit.

As a result, conventional VTRs experience an increase of circuit scale, thus causing also increases of costs.

Here, the Japanese Patent Application Tokkai-Hei 4-347991 discloses a inter-frame non-correlation removing (or extracting) circuit, or a video signal processing circuit for separating a luminance signal from a composite video signal.

However, in the conventional inter-frame non-correlation removing (or extracting) circuit disclosed in the Japanese Patent Application it is required that LPFs in a luminance signal extraction system and BPFs in a chrominance signal extraction system are constructed in a complementary relationship with each other for preserving a flat frequency characteristics. However such a requirement has a drawbacks that it not only restricts design conditions, but also causes the increases of circuit scale and costs of apparatus.

Further, in the conventional inter-frame non-correlation removing (or extracting) circuit disclosed in the Japanese Patent Application comb-filters for separating luminance signals is constructed in a non-cyclic type. Thus there is a drawback that it cannot achieve a sufficient S/N ratio.

SUMMARY OF THE INVENTION

It is, therefore, an object of the present invention is to provide a video signal processor which is not only reduced in the circuit scale but also improved in precision of NR operation, by constructing a single unit which is operable in common for the NR operation and the Y/C separation.

It is another object of the present invention to provide a video signal processor which is able to not only extract a luminance signal with a flat horizontal frequency characteristics by a simple circuit configuration, but also improve the S/N ratio in a luminance signal low band component, in particular, a video signal processor which is able to extract an inter-frame non-correlation component.

In order to achieve the above object, a video signal processor according to a first aspect of the present invention includes an input receiving unit for selectively receiving either of a baseband video signal and a composite video signal are selectively input as an input video signal thereto, a 1H delay unit for delaying the selected input video signal by one line period (1H), an inter-line non-correlation component extractor for extracting inter-line non-correlation components between the input video signal and the 1H delay signal from the 1H delay unit, an inter-frame non-correlation component remover for removing inter-frame non-correlation components from the selected input video signal, a first subtractor responsive to the selection of the baseband video signal for subtracting the inter-line non-correlation component from the baseband video signal processed the inter-frame non-correlation component removal at the inter-frame non-correlation component remover to result noise-reduced baseband video signals, a second subtractor responsive to the selection of the composite video signal the inter-line non-correlation component from the input composite video signal to result a first luminance signal, and a mixer for mixing a second luminance signal resulted from the inter-frame non-correlation component removal at the inter-frame non-correlation component remover with the first luminance signal from the second subtractor at a ratio defined by a motion signal to result a motion-adaptively processed luminance signal.

In order to achieve the above object, a video signal processor according to a second aspect of the present invention includes an input receiving unit for selectively receiving either of a baseband video signal and a composite video signal are selectively input as an input video signal thereto, a 1H delay unit for delaying the selected input video signal by one line period (1H), a 2H delay unit for delaying the selected input video signal by two line periods (2H), a three-dimension inter-line non-correlation component extractor for extracting three-dimension inter-line non-correlation components among the input video signal, the 1H delay signal from the 1H delay unit and the 2H delay signal from the 2H delay unit, an inter-frame non-correlation component remover for removing inter-frame non-correlation components from the selected input video signal, a first subtractor responsive to the selection of the baseband video signal for subtracting the three-dimension inter-line non-correlation component from the baseband video signal processed the inter-frame non-correlation component removal at the inter-frame non-correlation component remover to result noise-reduced baseband video signals, a second subtractor responsive to the selection of the composite video signal the three-dimension inter-line non-correlation component from the input composite video signal to result a first luminance signal, and a mixer for mixing a second luminance signal resulted from the inter-frame non-correlation component removal at the inter-frame non-correlation component remover with the first luminance signal from the second subtractor at a ratio defined by a motion signal to result a motion-adaptively processed luminance signal.

In order to achieve the above object, a video signal processor according to a third aspect of the present invention includes an input receiving unit for selectively receiving either of a baseband video signal and a composite video signal are selectively input as an input video signal thereto, a first BPF for extracting a prescribed frequency band from the selected input video signal, a 1H delay unit for delaying the selected input video signal by one line period (1H), a second BPF for extracting the prescribed frequency band from the 1H delay signal, an inter-line non-correlation component extractor for extracting inter-line non-correlation components between the input video signal from the first BPF and the 1H delay signal from the second BPF, each having the prescribed frequency band, an inter-frame non-correlation component remover for removing inter-frame non-correlation components from the selected input video signal, a first subtractor responsive to the selection of the baseband video signal for subtracting the inter-line non-correlation component from the baseband video signal processed the inter-frame non-correlation component removal at the inter-frame non-correlation component remover to result noise-reduced baseband video signals, a second subtractor responsive to the selection of the composite video signal the inter-line non-correlation component from the input composite video signal to result a first luminance signal, and a mixer for mixing a second luminance signal resulted from the inter-frame non-correlation component removal at the inter-frame non-correlation component remover with the first luminance signal from the second subtractor at a ratio defined by a motion signal to result a motion-adaptively processed luminance signal.

In order to achieve the above object, a video signal processor for processing a luminance/chrominance (Y/C) separation for a composite video signal according to a fourth aspect of the present invention includes a first comb filter for extracting luminance signal inter-frame non-correlation components from a composite video signal, a second comb filter for extracting chrominance signal from the composite video signal, and a subtractor for subtracting the luminance signal inter-frame non-correlation components from the first comb filter and the chrominance signal from the second comb filter from the composite video signal to result a luminance signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
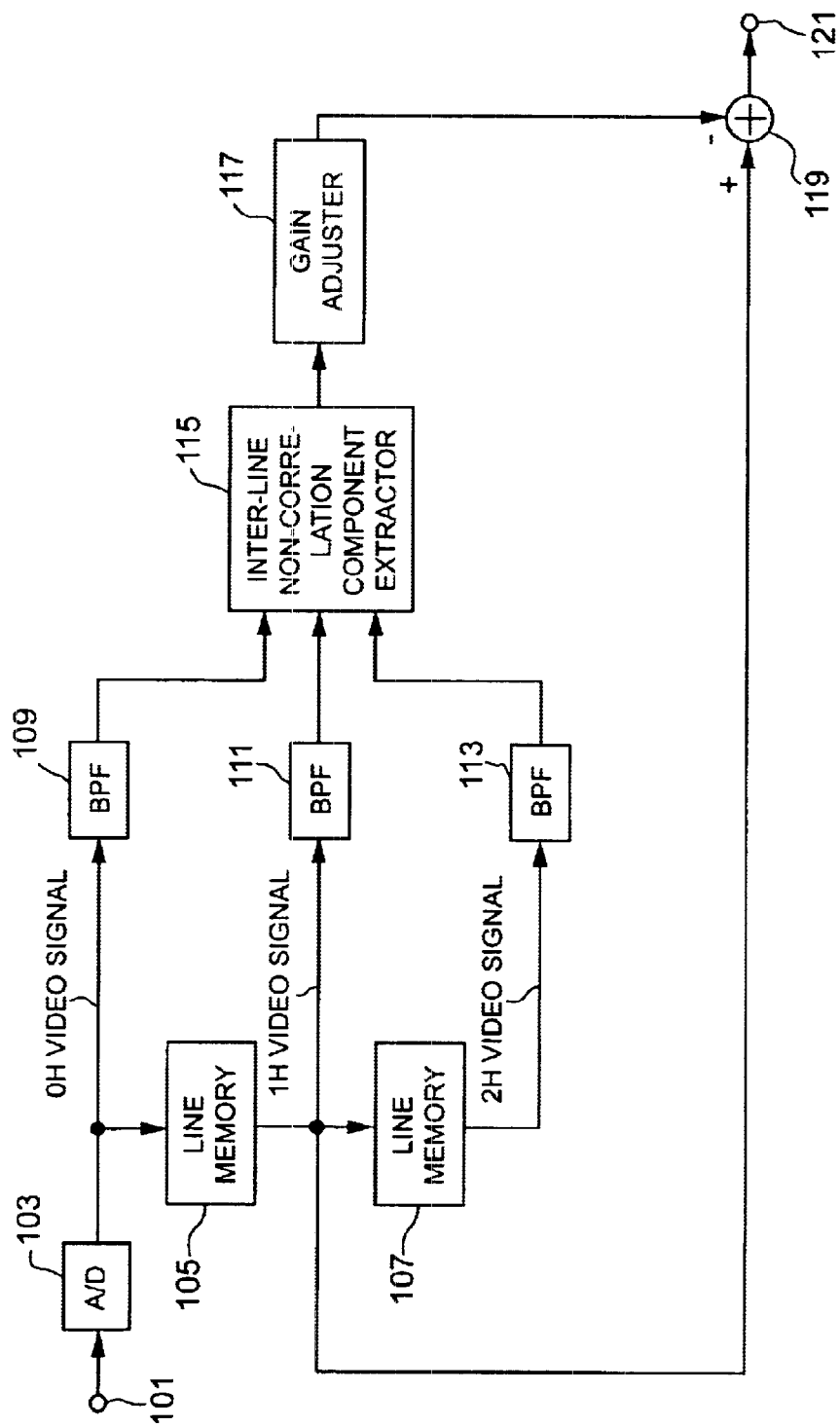
FIG. 1 is a block diagram showing the construction of a third embodiment of the video signal processor of the present invention.
Figure 2:
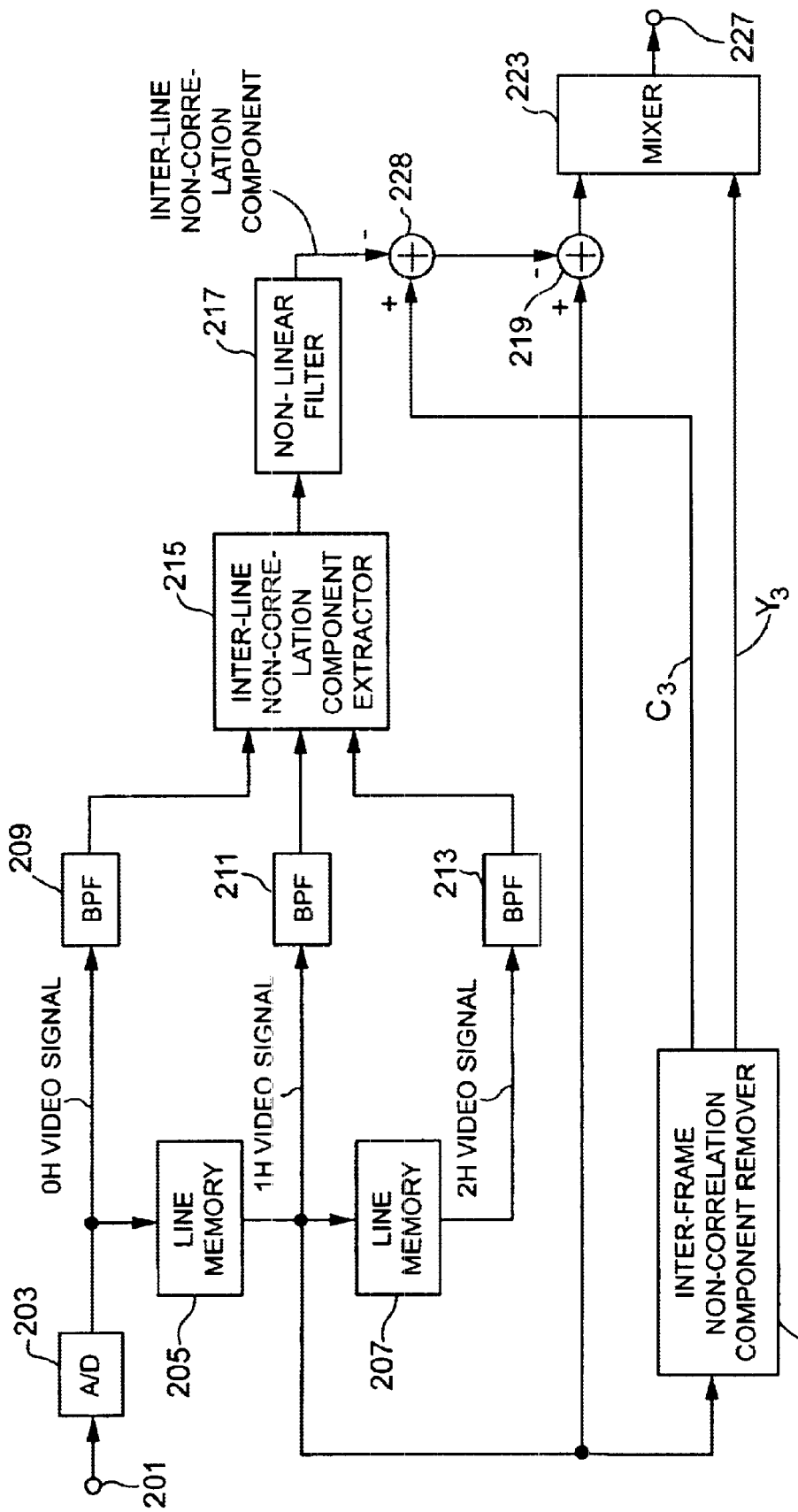
FIG. 2 is a block diagram showing the construction of a conventional noise reduction circuit.

The present invention will be described in detail with reference to the FIGS. 3 through 17.

Throughout the drawings, like or equivalent reference numerals or letters will be used to designate like or equivalent elements for simplicity of explanation.

Figure 3:
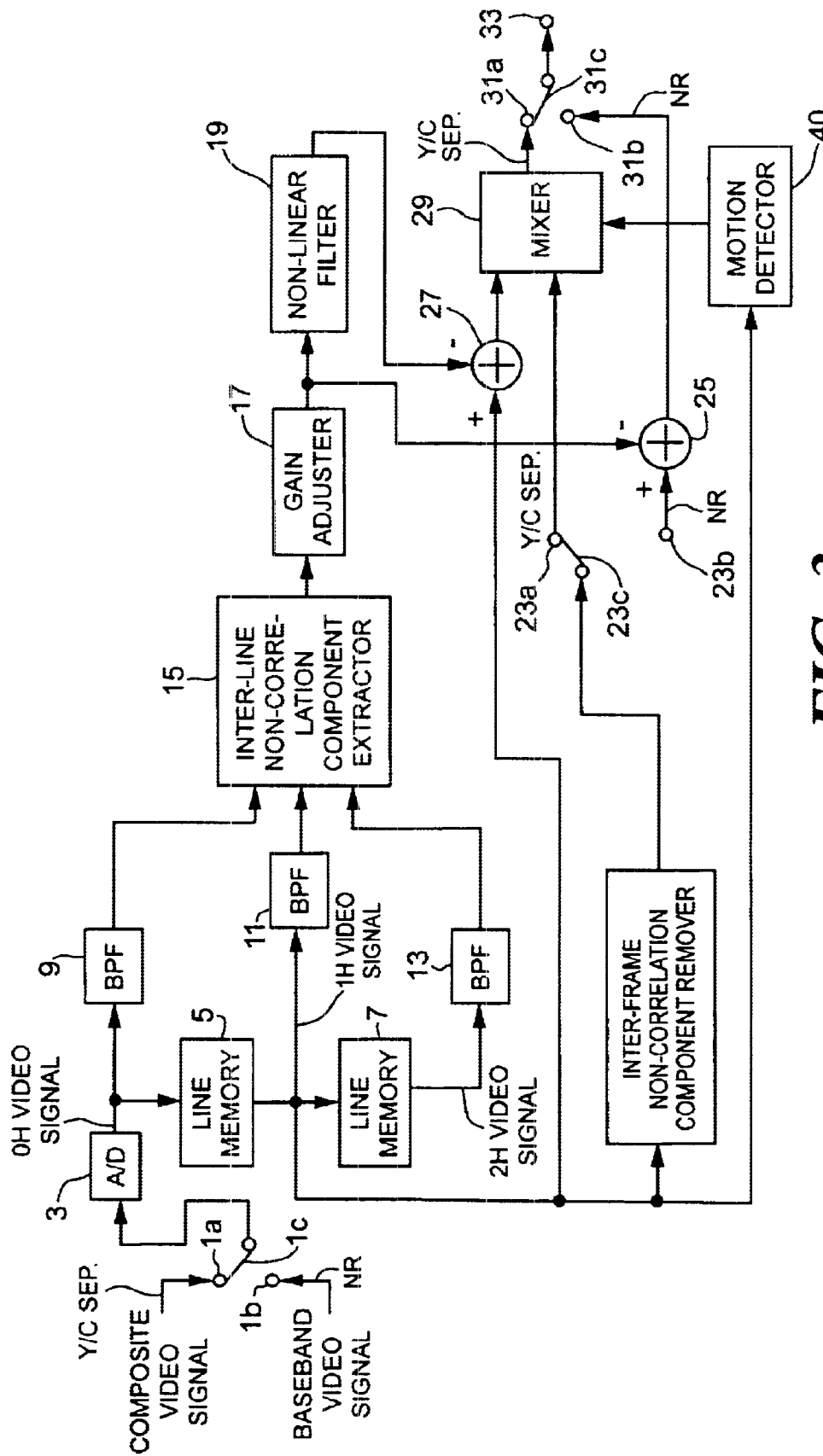
FIG. 3 is a block diagram showing the construction of a first embodiment of the video signal processor of the present invention.

Referring now to FIG. 3, a first embodiment of the video signal processor according to the present invention will be described in detail.

In the NR operation mode, a baseband video signal (Y, I or Q) reproduced at VTRs, video disc players etc. is input to an input terminal 1b of an input selector 1. In this operation mode, a moving contact 1c of the selector 1 is coupled to the input terminal 1b. While a moving contact 23c of a selector 23 is coupled to a fixed contact 23b. Also a moving contact 31c of an output selector 31 is coupled to a fixed contact 31b.

In the Y/C separation mode, the composite video signal is input to an input terminal 1a. In this operation mode, the moving contact 1c is coupled to another input terminal 1a. While the moving contact 23c of the selector 23 is coupled to another fixed contact 23a. Also the moving contact 31c of the output selector 31 is coupled to another fixed contact 31a.

The selected input video signal is supplied to an A/D converter 3. The A/D converter 103 converts the input analog video signal into the digital video signal and output. Then following video signal processing will be carried out in digital manner. The A/D converter 3 converts the input analog video signal into the digital video signal and outputs the signal. The video signal in this stage will be referred to as a 0H video signal hereinafter, for distinguishing from other video signals as described later.

The 0H video signal is supplied to a first line memory 5. The first line memory 5 delays the 0H video signal by one line period. The delayed video signal in this stage will be referred to as a 1H video signal hereinafter. The 1H video signal is supplied to a second line memory 7.

The second line memory 7 delays the 1H video signal by additional one line period. The delayed video signal in this stage will be referred to as a 2H video signal hereinafter.

The 0H video signal, the 1H video signal and the 2H video signal are supplied to BPFS 9, 11 and 13 which have a center frequency of 3.58 MHz. Thus common prescribed frequency bands around the center frequency of 3.58 MHz are extracted from the 0H video signal, the 1H video signal and the 2H video signal, respectively.

The 0H video signal, the 1H video signal and the 2H video signal each having the prescribed frequency band are supplied together to an inter-line non-correlation component extractor 15, wherein a non-correlation component among the three video signal is extracted. The inter-line non-correlation components are lead to a gain adjuster 17.

The gain adjuster 17 adjusts the gain of the inter-line non-correlation component. The gain-adjusted inter-line non-correlation components are then supplied to a subtractor 25 and a non-linear filter 19. The inter-line non-correlation component passing through the non-linear filter 19 is supplied to a subtractor 27.

The subtractor 27 subtracts the inter-line non-correlation component passing through the non-linear filter 19 from the 1H video signal. Thus a two-dimensionally separated luminance signal Y2 is achieved from the subtractor 27. The luminance signal Y2 obtained by the subtractor 27 is then supplied to a mixer 29.

Further, the 1H video signal is supplied to an inter-frame non-correlation component remover 21. The inter-frame non-correlation component remover 21 removes an inter-frame non-correlation component from the input video signal supplied thereto. Accordingly, in the NR operation mode wherein a baseband video signal reproduced by VTRs or video disc players is input through the input selector 1, the inter-frame non-correlation component remover 21 operates to remove an inter-frame non-correlation component of the baseband video signal in assuming the component as a noise contained in the video signal. That is, the inter-frame non-correlation component remover 21 carries out an NR operation. While in the Y/C separation mode wherein a composite video signal transmitted in TV broadcastings is input through the input selector 1, the inter-frame non-correlation component remover 21 operates to remove a chrominance component from the composite video signal which appears as an inter-frame non-correlation component. Resultantly, in this Y/C separation mode, the inter-frame non-correlation component remover 21 extract a three-dimensionally separated luminance signal Y3.

In the NR operation mode, the moving contact 23c of the selector 23 is coupled to the fixed contact 23b. Thus the baseband video signal processed the inter-frame NR at the inter-frame non-correlation component remover 21 is supplied to the subtractor 25 through the switch 23. The subtractor 25 subtracts the gain-adjusted inter-line non-correlation component lead from the gain adjuster 17 from the inter-frame NR processed video signal. The video signal obtained from the subtractor 25 is output through the output selector 31. Thus the highly NR processed video signal is obtained.

As the baseband video signal is further subtracted the inter-line non-correlation component therefrom after the inter-frame NR processing, the precision of the NR processing can be improved.

In the Y/C separation mode, the moving contact 23c of the selector 23 is coupled to the fixed contact 23a. Thus the three-dimensionally separated luminance signal Y3 from the inter-frame non-correlation component remover 21 is supplied to the mixer 29.

The mixer 29 the two-dimensionally separated luminance signal Y2 from the subtractor 27 with the three-dimensionally separated luminance signal Y3 from the inter-frame processing circuit 21 at a ratio defined by a motion signal detected from the composite video signal at a motion detector 40. Thus a motion-adaptively mixed luminance signal is obtained from the mixer 29 and then output through the output selector 31.

The moving contact 31c of the output selector 1 is coupled to the fixed contact 31b in the NR operation mode that the baseband video signal is selected in the input selector 1. While the moving contact 31c of the output selector 1 is coupled to the fixed contact 31a in the Y/C separation mode that the composite video signal is selected in the input selector 1.

Figure 4:
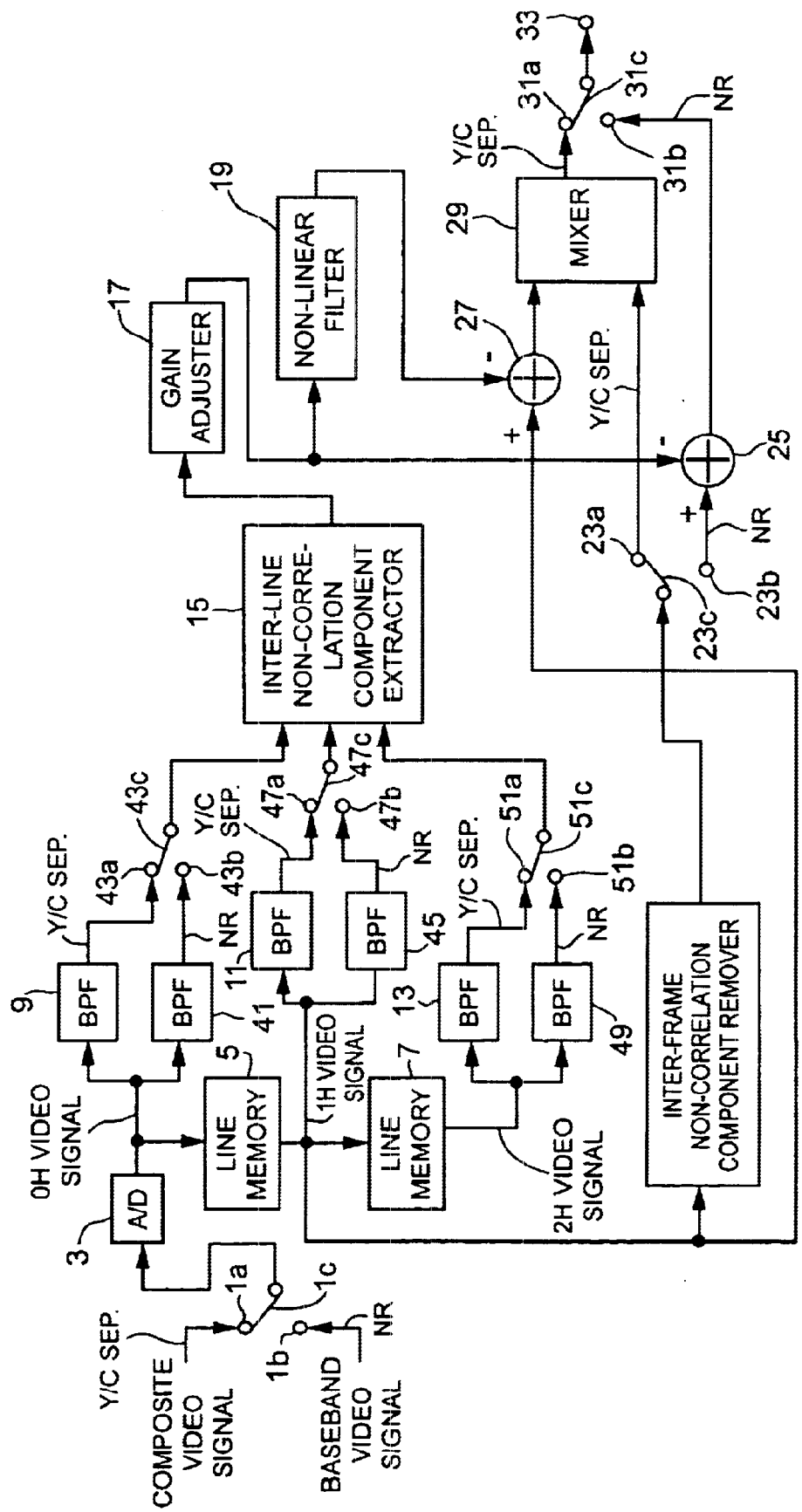
FIG. 4 is a block diagram showing the construction of a second embodiment of the video signal processor of the present invention.

Referring now to FIG. 4, a second embodiment of the video signal processor according to the present invention will be described in detail. The same elements as those, as shown in FIG. 3, will be assigned with the same reference numerals and the detailed explanations thereof will be omitted hereinafter.

In the present embodiment, BPFS 41, 45 and 49 each having the same center frequency of 7.16 MHz and BPF selectors 43, 47 and 51 are added.

The input terminal of the BPF 41 is connected to the output terminal of the A/D converter 3. While the output terminal of the BPF 41 is connected to a fixed contact 43b of the BPF selector 43. On the other hand, the output terminal of the BPF 9 is connected to another fixed contact 43a of the BPF selector 43.

The input terminal of the BPF 45 is connected to the output terminal of the first line memory 5. While the output terminal of the BPF 45 is connected to a fixed contact 47b of the BPF selector 47. On the other hand, the output terminal of the BPF 11 is connected to another fixed contact 47a of the BPF selector 47.

The input terminal of the BPF 49 is connected to the output terminal of the second line memory 7. While the output terminal of the BPF 49 is connected to a fixed contact 51b of the BPF selector 51. On the other hand, the output terminal of the BPF 13 is connected to another fixed contact 51a of the BPF selector 51.

When the baseband video signal is selected at the input selector 1, the moving contact 43c of the BPF selector 43 is coupled to the fixed contact 43b. While the moving contact 47c of the BPF selector 47 is coupled to the fixed contact 47b. Also the moving contact 51c of the BPF selector 51 is coupled to the fixed contact 51b.

When the composite video signal is selected at the input selector 1, the moving contact 43c of the BPF selector 43 is coupled to the fixed contact 43a. While the moving contact 47c of the BPF selector 47 is coupled to the fixed contact 47a. Also the moving contact 51c of the BPF selector 51 is coupled to the fixed contact 51a.

Thus by selectively coupling two different sets of BPFs between the NR operating mode and the Y/C separation mode, an optimum frequency band is extracted.

Further it is possible to locate the BPF selectors 43, 47 and 51 in front of the BPFs.

Further, it is possible to omit the set of the second line memory 7 and the BPF 13. Or on the contrary it is possible to add another set of a line memory and a BPF between the second line memory 7 and the inter-line non-correlation component extractor 15.

Further, it is also possible to omit the A/D converter 3. Further, the input baseband video signal is not limited to the one consisting of Y, I and Q signals, but it may consist of at least one of Y, I, Q, R, G, B, Cb and Cr signals.

As described above, according to the present invention, it is possible to reduce the circuit scale and improve accuracy in the NR operation mode by commonly using part of the NR circuit and the Y/C separation circuit.

Referring now to FIGS. 5–17, several emobodiments of the inter-frame non-correlation component removing or extracting circuit, according to the present invention will be described in detail.

Figure 5:
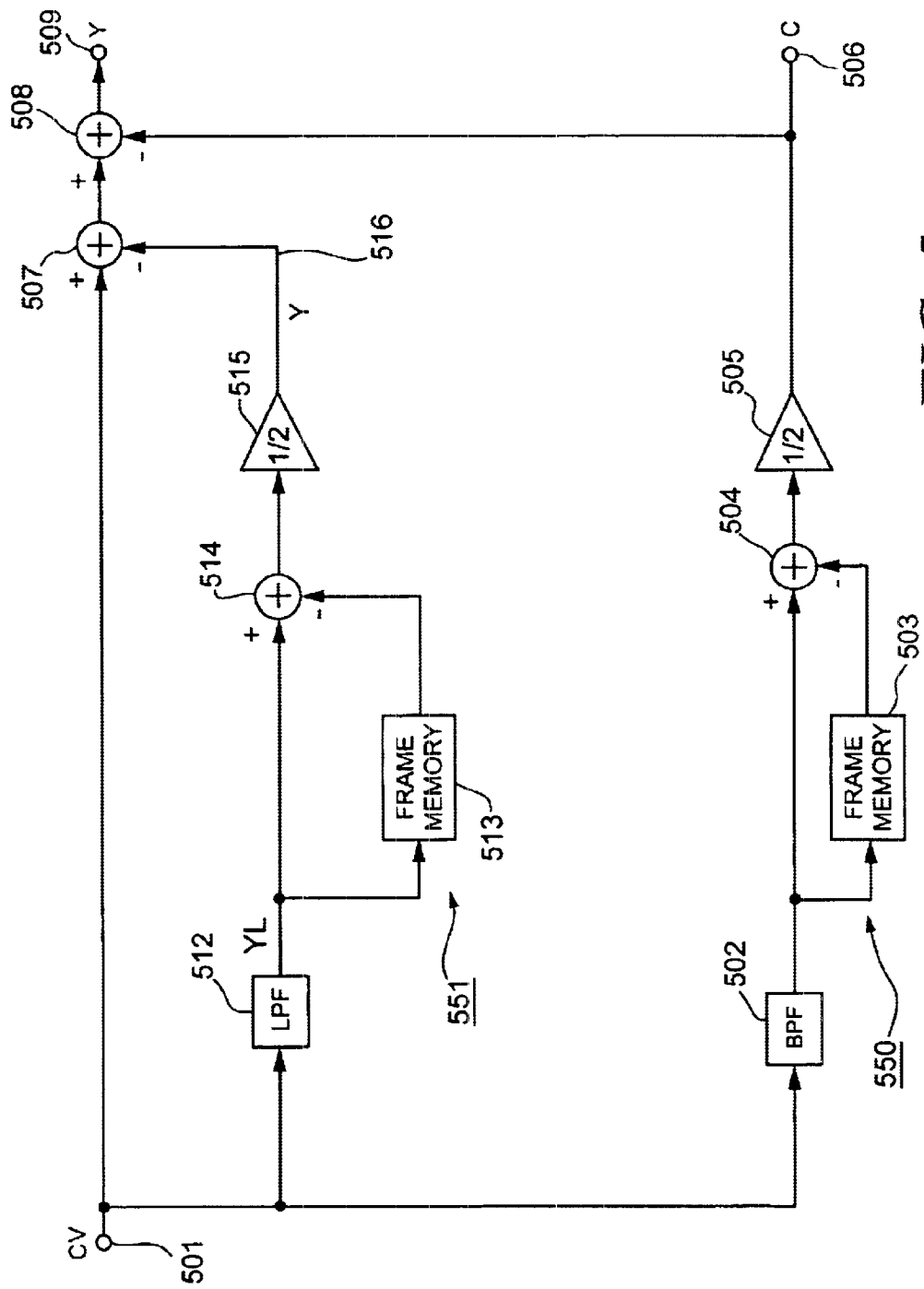
FIG. 5 is a block diagram for explaining a first embodiment of the inter-frame non-correlation component removing circuit of the present invention.
Figure 6:
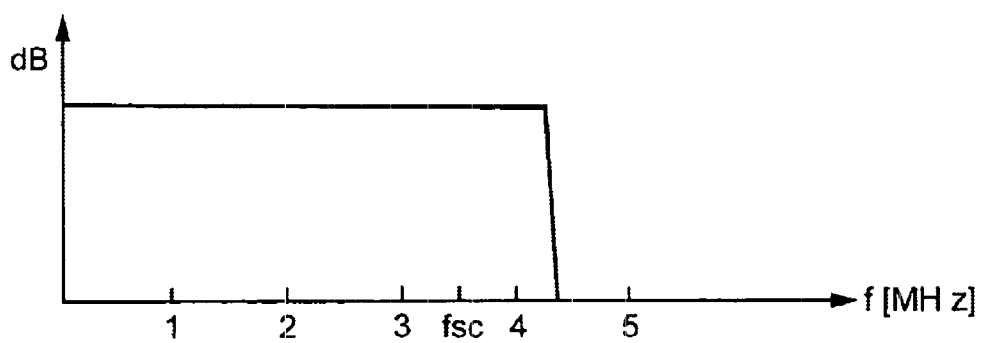
FIG. 6 is a diagram for explaining the operation of the circuit, as shown in FIG. 5.
Figure 7:
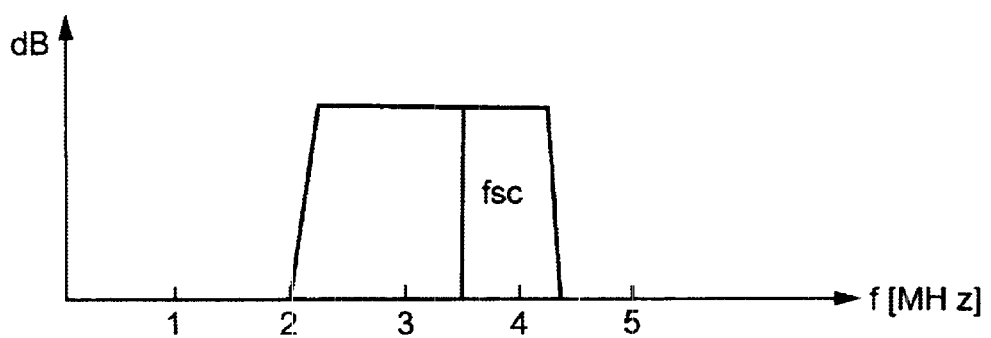
FIG. 7 is a diagram for explaining the operation of the circuit, as shown in FIG. 5.

FIG. 5 shows a first embodiment of the inter-frame non-correlation component removing circuit according to the present invention. A/D converted composite video signal is input through an input terminal 501. Herein, the embodiment will be explained taking the NTSC system video signal as an example of the composite video signal. In a BPF 502, a color sub-carrier band, as shown in FIG. 7, is extracted from the input composite video signal having the frequency band, as shown in FIG. 6. The color sub-carrier band obtained in the BPF 502 is supplied to a frame memory 503 and a subtractor 504, respectively. In the subtractor 504, a frame difference of the color sub-carrier band is obtained by subtracting between the output of the frame memory 503 and the output of the BPF 502. The frame difference of the color sub-carrier band is supplied to a multiplier 505 wherein the frame difference of the color sub-carrier band is multiplied by ½ and thus level-suppressed. The frame memory 503, the subtractor 504 and the multiplier 505 construct a non-cyclic type frame comb filter 550 of gain 1. Thus a chrominance signal C resulted by the inter-frame Y/C separation is obtained from an output terminal 506.

Figure 8:
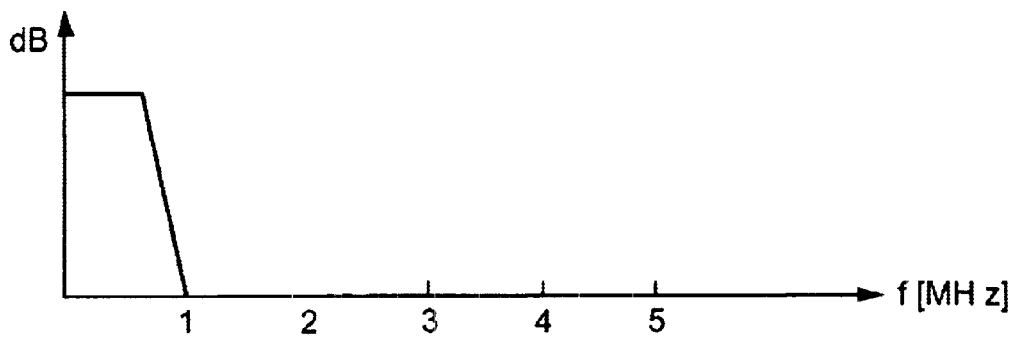
FIG. 8 is a diagram for explaining the operation of the circuit, as shown in FIG. 5.

On the other hand, an LPF 512 extracts a luminance signal low band component YL with the frequency band (ranging from DC to 1 MHz), as shown in FIG. 8, from the input composite video signal, as shown in FIG. 6. The output of the horizontal LPF 512 is supplied to a frame memory 513 and a subtractor 514, respectively. In the subtractor 514, a frame difference of the luminance signal low band component YL is obtained by subtracting from the output of the frame memory 513 and the output of the LPF 512. The frame difference is supplied to a multiplier 515, and wherein the frame difference is multiplied by ½ and thus level-suppressed by the ½. The frame memory 513, the subtractor 514 and the multiplier 515 construct a non-cyclic type frame comb filter 551 of gain 1. Thus a luminance signal low band noise component YLN is obtained from the output of the multiplier 515.

The composite video signal is subtracted the luminance signal low band noise component YLN in a subtractor 507. Further the resulted video signal from the subtractor 507 is subtracted the chrominance signal C in a subtractor 508. Thus the luminance signal Y is obtained through an output terminal 509.

The luminance signal low band noise component YLN obtained from the luminance low band noise extraction comb filter 551 and the chrominance signal C obtained from the chrominance signal extraction comb filter 550 are frequency interleaved for a still picture component of luminance signals in the composite video signal. Thus as both of the luminance signal low band noise component YLN and the chrominance signal C are subtracted from the composite video signal so as to output the still picture component of the luminance signal from the output terminal 509, it is able to achieve such a luminance signal Y having a flat horizontal frequency characteristics.

Further, it is not obliged to apply a complementary relationship to the LPF 512 for extracting luminance signal low band component sand the BPF 502 for extracting chrominance signals. Thus the LPF 512 and the BPF 502 can be designed with a greater flexibility without receiving any influence from each other. In case that both of the LPF 512 and the BPF 502 are designed in a complementary relationship with each other, a maximum improvement of the S/N ratio is achieved for the luminance signal. Even in another extreme case that there exists no luminance signal noise component extraction comb filter 551, the Y/C signal separation is available. However, there will be no longer achieved an improvement of the S/N ratio for the luminance signal low band component. In this case, the LPF 512 and the BPF 502 can be designed in consideration of only their characteristics and circuit scale in independently from each other.

As this first embodiment is of such a type that the chrominance signal and the luminance signal low band noise component are extracted and then subtracted from the composite video signal, the LPF for extracting the luminance signal low band noise component and the BPF for extracting the chrominance signal can be designed with a greater flexibility. Thus a luminance signal having a flat horizontal frequency characteristics is obtained without giving them a complementary relationship with each other.

Further, as luminance signals have an inter-field correlation as well as an inter-frame correlation, the frame memory 513 and the frame comb filter 551 can be replaced by a corresponding field frame memory and a corresponding field comb filter.

Figure 9:
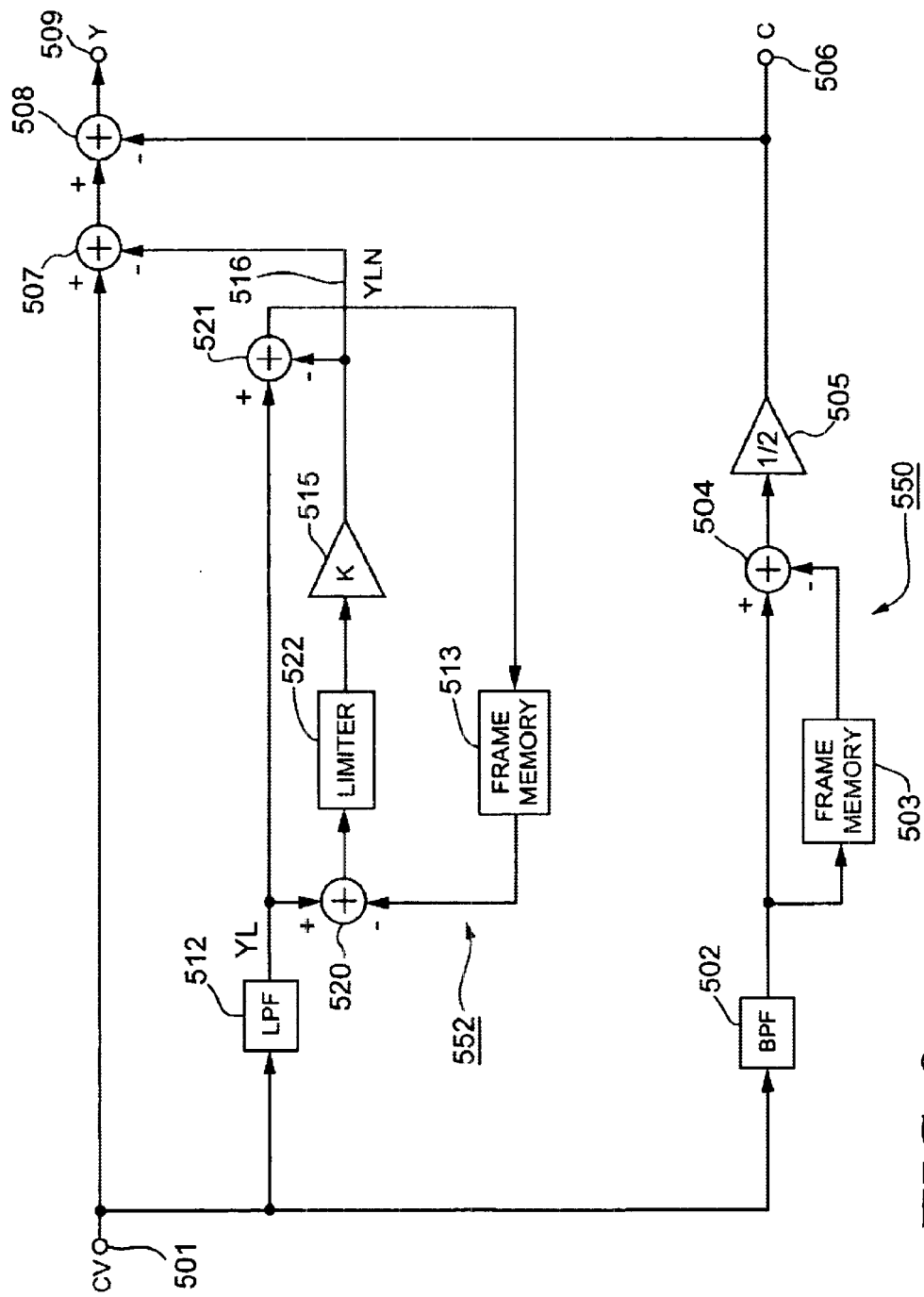
FIG. 9 is a block diagram for explaining a second embodiment of the inter-frame non-correlation component removing circuit of the present invention.

FIG. 9 shows a block diagram of a second embodiment of the inter-frame non-correlation component removing circuit according to the present invention. As this second embodiment is the same as the first embodiment, as shown in FIG. 5, in regards to the section for extracting the chrominance signal C, the same reference numerals will be assigned to the same elements and the detailed explanations thereof will be omitted hereinafter. While a section for extracting the luminance signal low band noise component, which is different from that of the first embodiment, will be explained in detail.

In FIG. 9, the LPF 512 extracts the luminance signal low band component from the input composite video signal. The luminance signal low band component output from the LPF 512 is supplied to subtractors 520 and 521, respectively. The output of the subtractor 521 is supplied to the subtractor 520 via the frame memory 513. While the output of the subtractor 520 is supplied to the multiplier 515 via a limiter 522. In the multiplier 515, the output from the limiter 522 is multiplied by a fixed coefficient K above 0 but less than 1. The multiplied signal from the multiplier 515 is supplied to the subtractor 521 and 507, respectively.

The frame memory 513, the subtractors 520, 521, the limiter 522 and the multiplier 515 construct a cyclic type frame comb filter 552. Thus the luminance signal low band noise component YLN is obtained at a node 516.

The luminance signal low band noise components are subtracted from the composite video signal in the subtractor 507. The chrominance signal C is subtracted from the output of the subtractor 507 in the subtractor 508 in similar to the embodiment, as shown in FIG. 5. Thus a luminance signal Y is obtained at the output terminal 509.

Thus, when the coefficient K is 0.75, an improvement of about 8 dB is achieved for the S/N ratio in the luminance signal low band component. Generally, cyclic type comb filters have a higher improvement of the S/N ratio than non-cyclic type comb filters. Further, since image noises are conspicuous at a low frequency band below around 1 to 2 MHz, an improvement of the S/N ratio in the frequency band is effective to achieve a visually good S/N image.

In the present embodiment, a cyclic type comb filtering is applied for the luminance signal low band component. Therefore, a higher improvement of the S/N ratio than a non-cyclic type comb filter is achieved.

Figure 10:
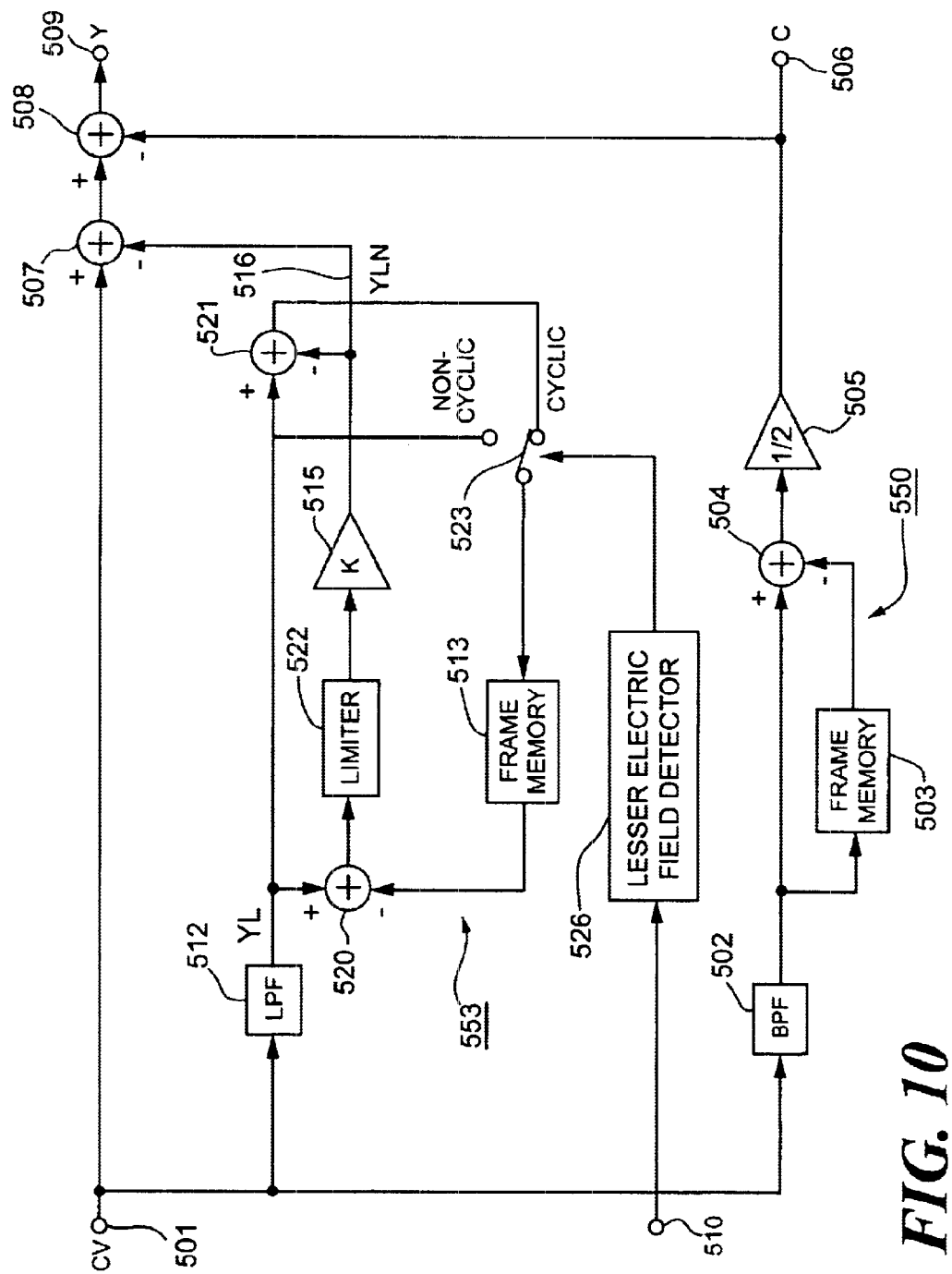
FIG. 10 is a block diagram for explaining a third embodiment of the inter-frame non-correlation component removing circuit of the present invention.

FIG. 10 shows a block diagram of a third embodiment of the inter-frame non-correlation component removing circuit according to the present invention. As this third embodiment is the same as the first embodiment, as shown in FIG. 5, in regards to the section for extracting the chrominance signal C, the same reference numerals will be assigned to the same elements and the detailed explanations thereof will be omitted hereinafter. While a section for extracting the luminance signal low band noise component, which is different from that of the first embodiment, will be explained in detail.

In FIG. 10, the LPF 512 extracts the luminance signal low band component from the input composite video signal. The output of the LPF 512 is supplied to the subtractors 520, 521 and a selector 523, respectively. The selector 523 is coupled to the output of the LPF 512. Thus the output of the subtractor 521 is supplied to the subtractor 520 via the frame memory 513. The output of the subtractor 520 is supplied to the multiplier 515 via the limiter 522. In the multiplier 515, the output from the limiter 522 is multiplied by a fixed coefficient K about 0 but less than 1. The multiplied signal from the multiplier 515 is supplied to the subtractors 521 and 507, respectively.

The frame memory 513, the subtractors 520, 521, the limiter 522, the multiplier 515 and the selector 523 construct a frame comb filter 553. When the output of the subtractor 521 is selected by the selector 523, the frame comb filter 553 functions as a cyclic type filter. While when the output of the LPF 512 is selected by the selector 523, the frame comb filter 553 functions as a non-cyclic type filter. A lesser electric field detector 526 controls the selector 523 to select a cyclic type filter configuration having a higher improvement of the S/N ratio in response to reception of lesser electric field broadcast wave at the input terminal 510. While the lesser electric field detector 526 has detected reception of a strong electric field broadcast wave, a non-cyclic type filter configuration is selected by the selector 523. Thus, the luminance signal low band noise components are obtained at the node 516.

The luminance signal low band noise components are subtracted from the composite video signal in the subtractor 507. The chrominance signal C is subtracted from the output of the subtractor 507 in the subtractor 508 in similar to the embodiment, as shown in FIG. 5. Thus a luminance signal Y is obtained at the output terminal 509.

Generally, cyclic type comb filters have a higher improvement of the S/N ratio than non-cyclic type comb filters, but they have a drawback of causing residual images at an intense image motion. In the present embodiment, a priority is given to the improvement of the S/N ratio in reception of lesser electric field broadcast wave. While in reception of a strong electric field broadcast wave a non-cyclic type comb filter is selected. Thus in either case of broadcast wave reception the present embodiment is able to obtain high quality.

Figure 11:
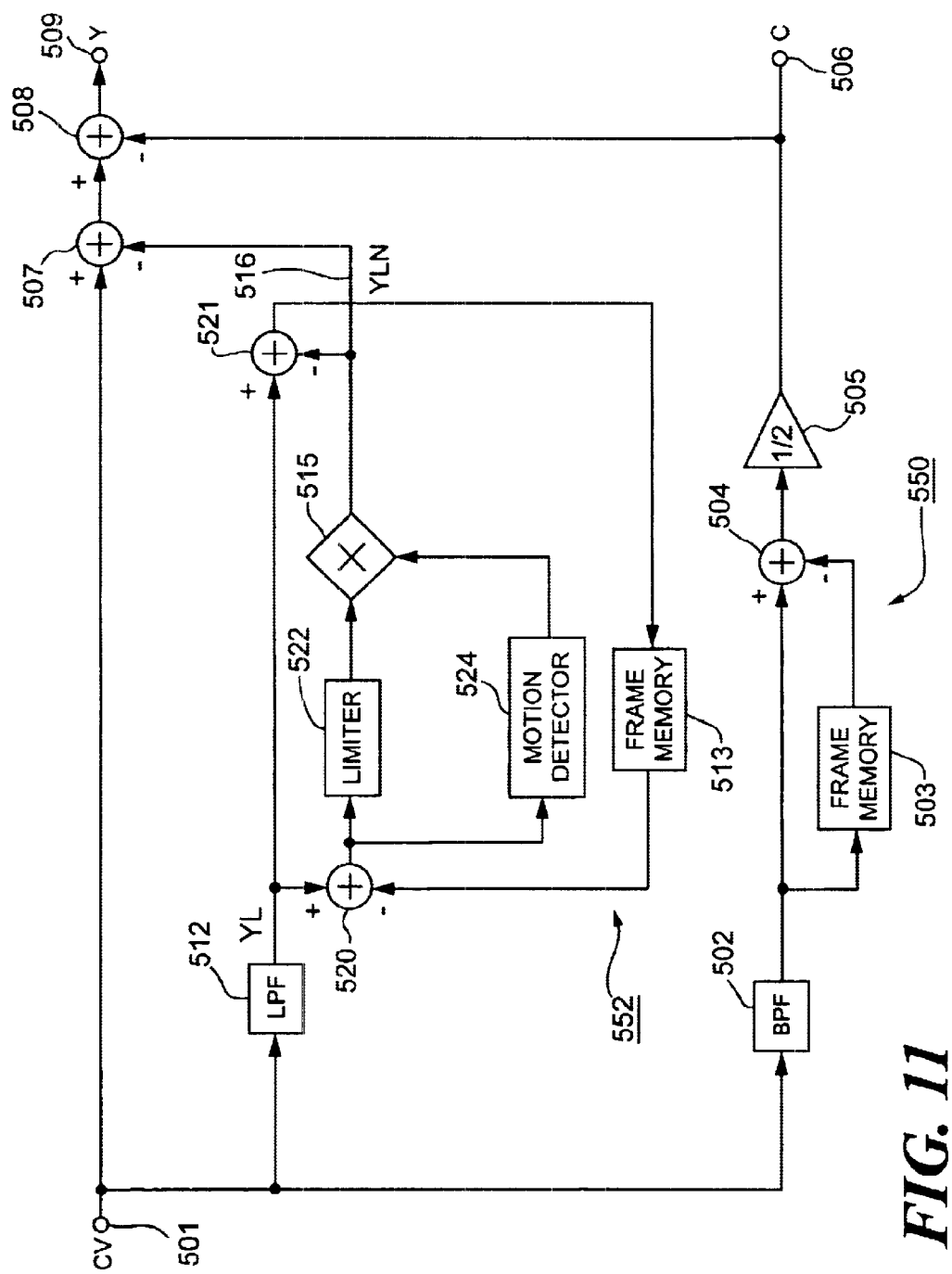
FIG. 11 is a block diagram for explaining a fourth embodiment of the inter-frame non-correlation component removing circuit of the present invention.

FIG. 11 shows a block diagram of a fourth embodiment of the inter-frame non-correlation component removing circuit according to the present invention. At this fourth embodiment is the same as the first embodiment, as shown in FIG. 5, in regards to the section for extracting the chrominance signal C, the same reference numerals will be assigned to the same elements and the detailed explanations thereof will be omitted hereinafter. While a section for extracting the luminance signal low band noise component, which is different from that of the first embodiment, will be explained in detail.

That is, the extraction of the luminance signal low band noise component in the present embodiment is almost the same as that in the second embodiment, as shown in FIG. 9. While the motion-adaptive operation performed by the comb filtering applied for the luminance signal is different from that in the second embodiment. In the second embodiment, as shown in FIG. 9, the coefficient K of the multiplier 515 is simply described as it taking the value above 0 but less than 1. While in this fourth embodiment the coefficient K is made variable in accordance with motions of pixels.

A motion detector 524 generates a coefficient K with a value in proportion to the degree of motion by using the frame difference signal obtained by the subtractor 520. The generated coefficient K is supplied to the multiplier 515. When there is no motion at all, a coefficient with a relatively large value close to 1 is generated. Thus a large improvement of the S/N ratio is achieved. Further, if the coefficient is made large at an intense image motion, a residual image trails after its real image on a display screen. Therefore, the more the image motion goes intense, the more the coefficient is made closer to 0 in order to prevent the residual images.

In the fourth embodiment, the comb filtering applied for the luminance signal provides a motion-adaptive operation so as to yield the luminance signal low band noise component at the node 516. Thus it becomes possible to extract luminance signal Y without adversely affecting moving images.

Figure 12:
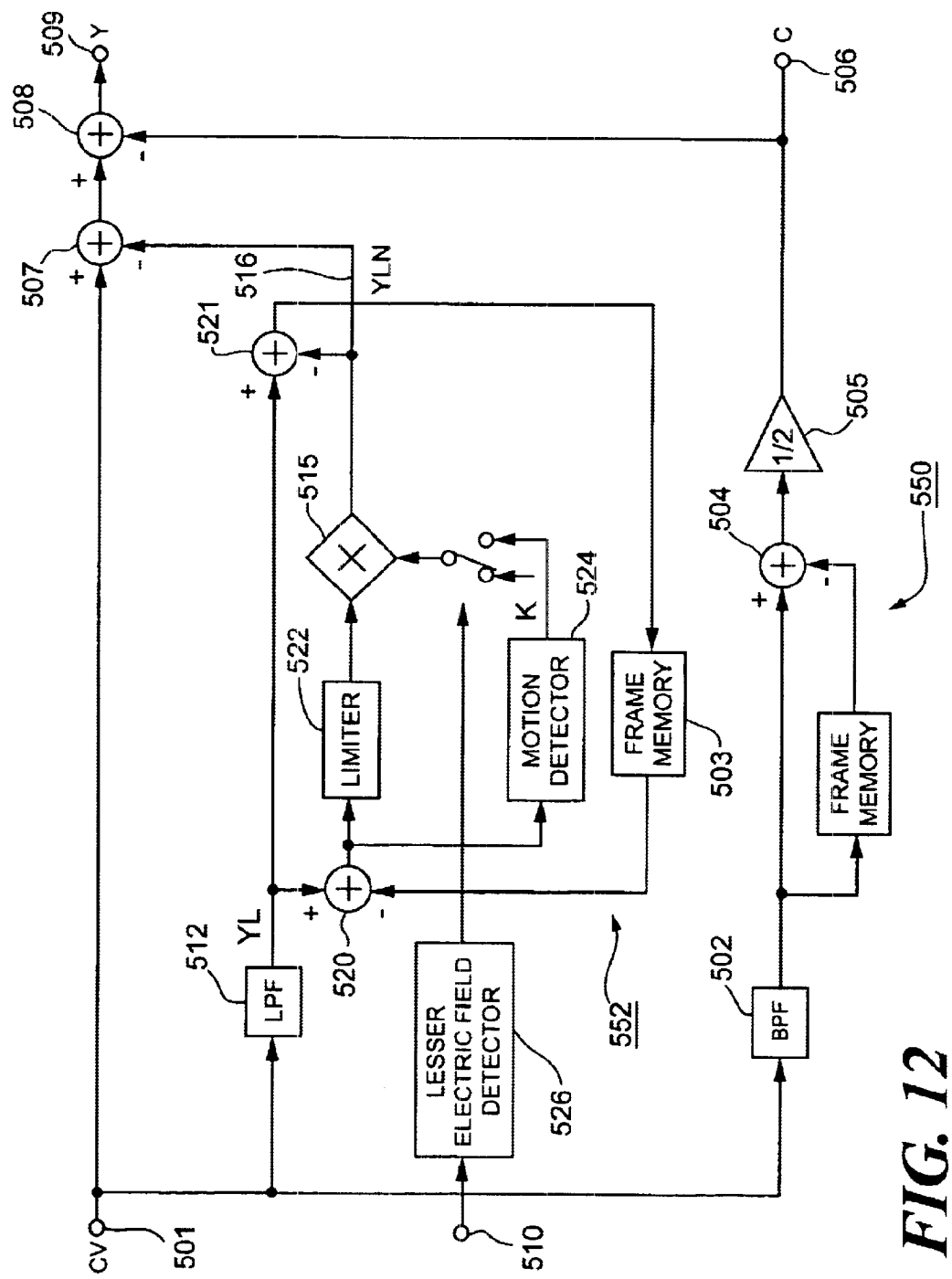
FIG. 12 is a block diagram for explaining a fifth embodiment of the inter-frame non-correlation component removing circuit of the present invention.

FIG. 12 shows a block diagram of a fifth embodiment of the inter-frame non-correlation component removing circuit according to the present invention. As this fifth embodiment is the same as the first embodiment, as shown in FIG. 5, in regards to the section for extracting the chrominance signal C, the same reference numerals will be assigned to the same elements and the detailed explanations thereof will be omitted hereinafter. While a section for extracting the luminance signal low band noise component, which is different from that of the first embodiment, will be explained in detail.

That is, the luminance signal low band noise component extraction is the same as that in the fourth embodiment, as shown in FIG. 11. While the present embodiment differs in that a comb filtering applied for the luminance signal is able to select the motion-adaptive operation and the motion non-adaptive operation.

In the fourth embodiment, as shown in FIG. 11, the coefficient of the multiplier 515 was variable in accordance with the image motion. While in this fifth embodiment, the output of the motion detector 524 is supplied to the multiplier 515 via the selector 523. Another fixed contact of the selector 523 is supplied with a fixed value about 0 but less than 1. If the output of the motion detector 524 is selected by the selector 523, the motion-adaptive operation as described in the fourth embodiment of the inter-frame non-correlation component removing circuit is carried out. If a fixed value K is selected as the coefficient, a motion-independent non-adaptive operation is carried out.

When receiving a broadcast wave detection signal from the input terminal 510 and judged reception of a lesser electric field broadcast wave, the lesser electric field detector 526 changes the selector 523 to the fixed value K side. As a relatively large value close to 1 is given to the coefficient K, a higher improvement of the S/N ratio is achieved. In reception of a lesser electric field broadcast wave, the output of the motion detector 524 is selected by the selector 523 for effecting a comb filter as a motion-adaptive type filter.

Thus, a comb filter for filtering luminance signals selects the motion-adaptive operation and the motion non-adaptive operation and the luminance signal low band noise components are obtained at the node 516. A luminance signal extraction afterwards is the same as that in the fourth embodiment of the inter-frame non-correlation component removing circuit.

In this fifth embodiment, the comb filtering applied for the luminance signal low band components are selectable between a motion-adaptive type and a motion non-adaptive type. Thus, in reception of a lesser electric field broadcast wave the motion non-adaptive cyclic type is selected for taking preference to an improvement of the S/N ratio. In reception of a strong electric field broadcast wave the motion-adaptive type is selected in order to avoid an affect by the motion non-adaptive cyclic type filter. In both cases, high quality images can be obtained.

Figure 13:
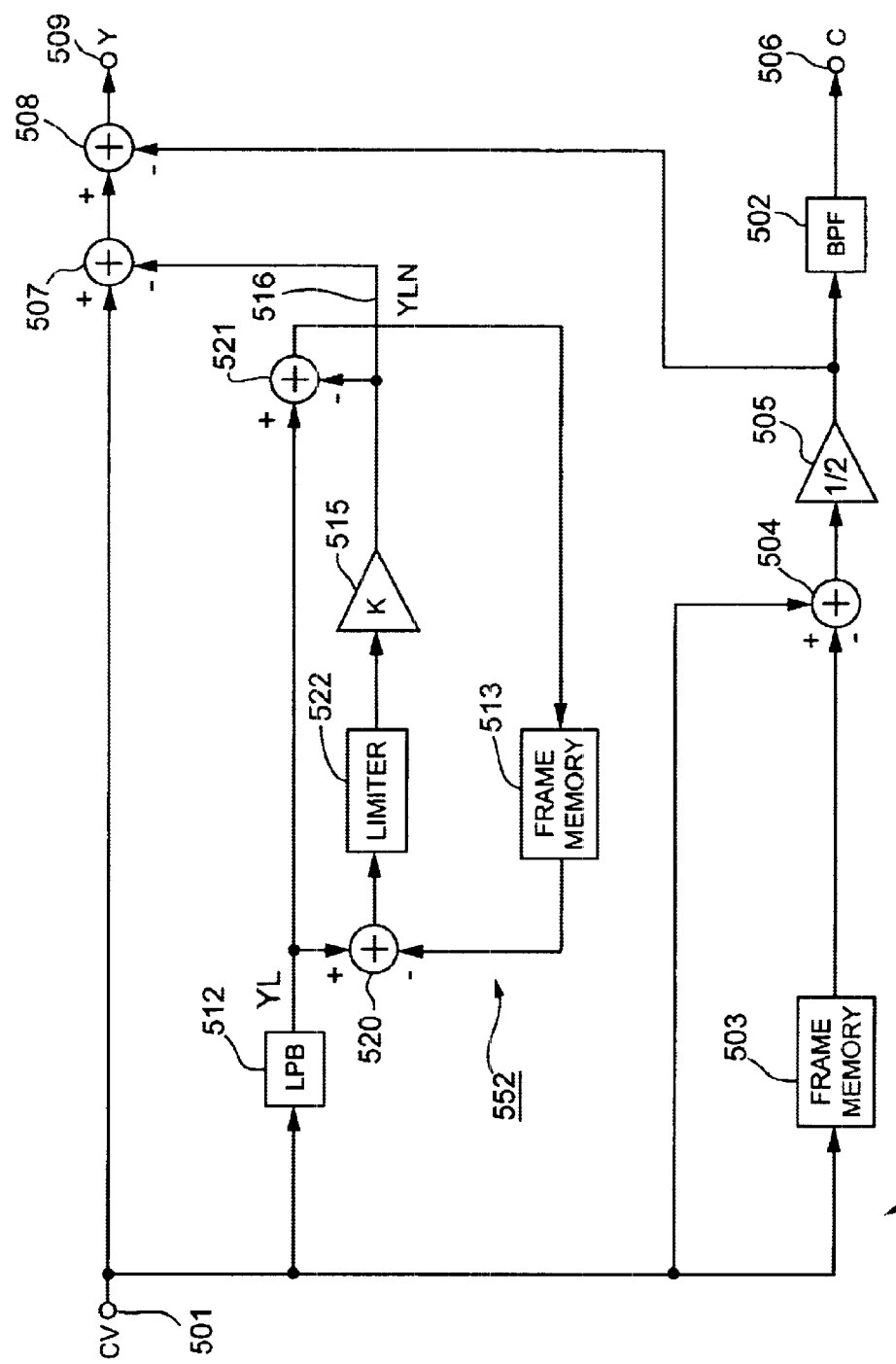
FIG. 13 is a block diagram for explaining a sixth embodiment of the inter-frame non-correlation component removing circuit of the present invention.

FIG. 13 is a block diagram for explaining a sixth embodiment of the inter-frame non-correlation component removing circuit according to the present invention. As this sixth embodiment is the same as the fifth embodiment, as shown in FIG. 12, in regards to the section for extracting the luminance signal low band noise component, the same reference numerals will be assigned to the same elements and the detailed explanations thereof will be omitted hereinafter. While a section for extracting the chrominance signal C, which is different from that of the fifth embodiment, will be explained in detail.

A composite video signal CV is supplied to the frame memory 503 and the subtractor 504 without limiting the frequency band of the signal CV. The output of the subtractor 504 is supplied to the multiplier 505. The fame memory 503, the subtractor 504 and the multiplier 505 construct the non-cyclic type frame comb filter 550. Thus a chrominance signal and a luminance signal inter-frame non-correlation component are obtained at the output of the multiplier 505. When the input is multiplied by ½ in the multiplier 505 and output, and a color subcarrier band is extracted by the BPF 502, the frame Y/C separated chrominance signal can be obtained at the output terminal 506.

Thus, the video signal processor is so constructed that a comb filtering is applied for the whole frequency band of composite video signal. Therefore, the luminance signal non-correlation component and the chrominance signal in the whole frequency band are output via the multiplier 505. As the luminance signal non-correlation component in the whole frequency band is subtracted from the output of the subtractor 507 at the subtractor 508, noise components are removed from the whole frequency band of luminance signal. Thus, a further improvement of the S/N ratio can be achieved.

Figure 14:
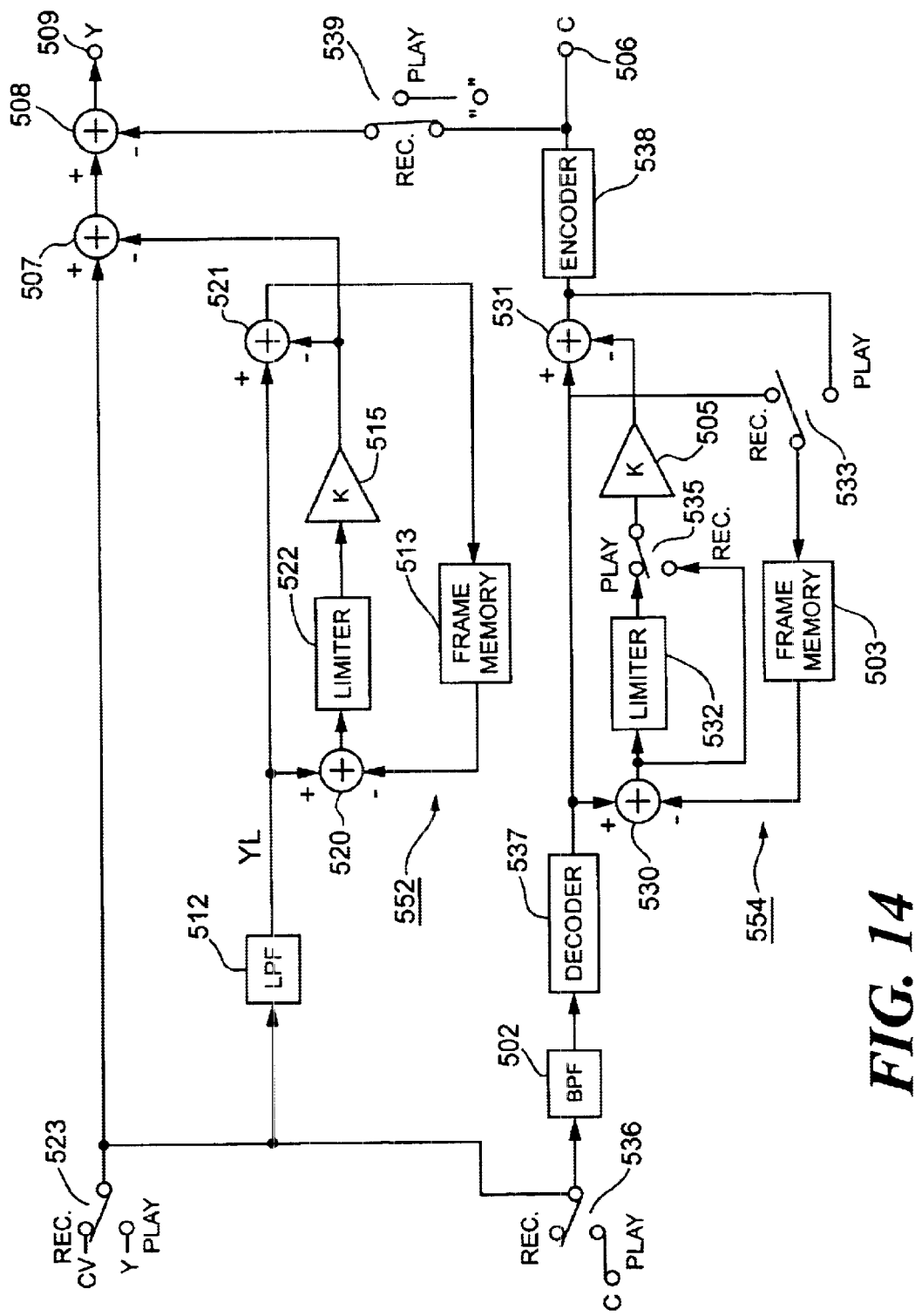
FIG. 14 is a block diagram for explaining a seventh embodiment of the inter-frame non-correlation component removing circuit of the present invention.

FIG. 14 shows a block diagram of a seventh embodiment of the inter-frame non-correlation component removing circuit according to the present invention. This seventh embodiment is intended for use in home VTRs with both of a VTR recording mode and a VTR reproduction mode. In the recording mode, the inter-frame Y/C separation of composite video signal is performed. While in the reproduction mode, the frame noise reduction of luminance and chrominance signals is performed.

First, the reproduction mode will be described in detail. The selector 523 selects a luminance signal Y and then supplies it to the subtractor 507, LPF 512 and selector 536, respectively. The output of the LPF 512 is supplied to the subtractors 520 and 521, respectively. The output of the subtractor 521 is supplied to the subtractor 520 via the frame memory 513. The output of the subtractor 520 is supplied to the respective of the subtractors 521 and 507 via the limiter 522 and the multiplier 515.

As described in the first embodiment, as shown in FIG. 5, the subtractors 520, 521, the frame memory 513, the limiter 522 and the multiplier 515 construct the cyclic type frame comb filter 552. Thus the luminance signal low band noise components are obtained at the node 516. If the luminance signal low band noise components are subtracted from composite video signal at the subtractor 507, the noise reduced luminance signal can be obtained. Although the luminance signal obtained at the subtractor 507 is supplied to the subtractor 508, as the other input terminal of the subtractor 508 is substantially deactivated by a selector 539, the luminance signal is led to the output terminal 509 as it is.

The selector 536 selects carrier chrominance signal C and then supplies it to the BPF 502. The BPF 502 extracts the color subcarrier band, while a decoder 537 decodes the color subcarrier band signal. The output of the decoder 537 is supplied to subtractors 530 and 531, respectively. The output of the subtractor 531 is supplied to the subtractor 530 via a selector 533 and the frame memory 503. The output of the subtractor 530 is supplied to the subtractor 531 via a limiter 532, the selector 536 and the multiplier 505. Here, the subtractors 530, 531, frame memory 503, limiter 532 and multiplier 505 construct a cyclic type frame comb filter 554. Thus a noise reduced base band chrominance signal is obtained in the output of the subtractor 531. The signal is converted into a carrier chrominance signal in an encoder 538 and then led to the output terminal 506.

Now, the recording mode will be described in detail. The selector 523 selects the composite vide signal CV. As the extraction of the luminance signal low band noise component is carried out in similar to that in the second embodiment, as shown in FIG. 9, the detailed explanations thereof will be omitted hereinafter. While an extraction of a chrominance signal C, which is different from that of the second embodiment, will be explained in detail.

The selector 536 selects the composite video signal CV and then supplies it to the BPF 502. The BPF 502 extracts a color subcarrier band, while the decoder 537 decodes the color subcarrier. The output of the decoder 537 is supplied to the subtractors 530 and 531, respectively. The output of the decoder 537 is supplied to the subtractor 530 via the selector 533 and the frame memory 503. The output of the subtractor 530 is supplied to the subtractor 531 by bypassing the limiter 532 in effect of the selector 535, but passing through the multiplier 505. Here, the subtractor 530, 531, frame memory 503, limiter 532 and multiplier 505 construct a non-cyclic type frame comb filter 555. Thus the inter-frame Y/C separated base band chrominance signal is obtained in the output of the subtractor 531. The chrominance signal is converted into the carrier chrominance signal by the encoder 538 and led to the output terminal 506. Further, the carrier chrominance signal supplied to the other input of the subtractor 508 and then subtracted from the output of the subtractor 507. Thus a luminance signal can be obtained at the output terminal 509.

Thus, the input signal is selected according to the inter-frame Y/C separation mode or the inter-frame NR operation mode for effecting the comb filtering applied for the luminance signal low band component and the comb filtering applied for the color subcarrier band component as a noise reducer for a luminance signal and a chrominance signal in the noise reduction mode. Therefore, it is possible to achieve a high degree of common use of the same circuit, a low-cost unit capable of the inter-frame Y/C separation and the inter-frame noise reduction.

Further, as the frequency bands of the output of LPF 512 and the output of the decoder 537 are limited their bandwidths than those of the composite video signals or the input luminance signals, when a sampling and an interpolation are carried out prior and after the frame memories 503 and 513, it is also possible to reduce the frame memory capacity.

Figure 15:
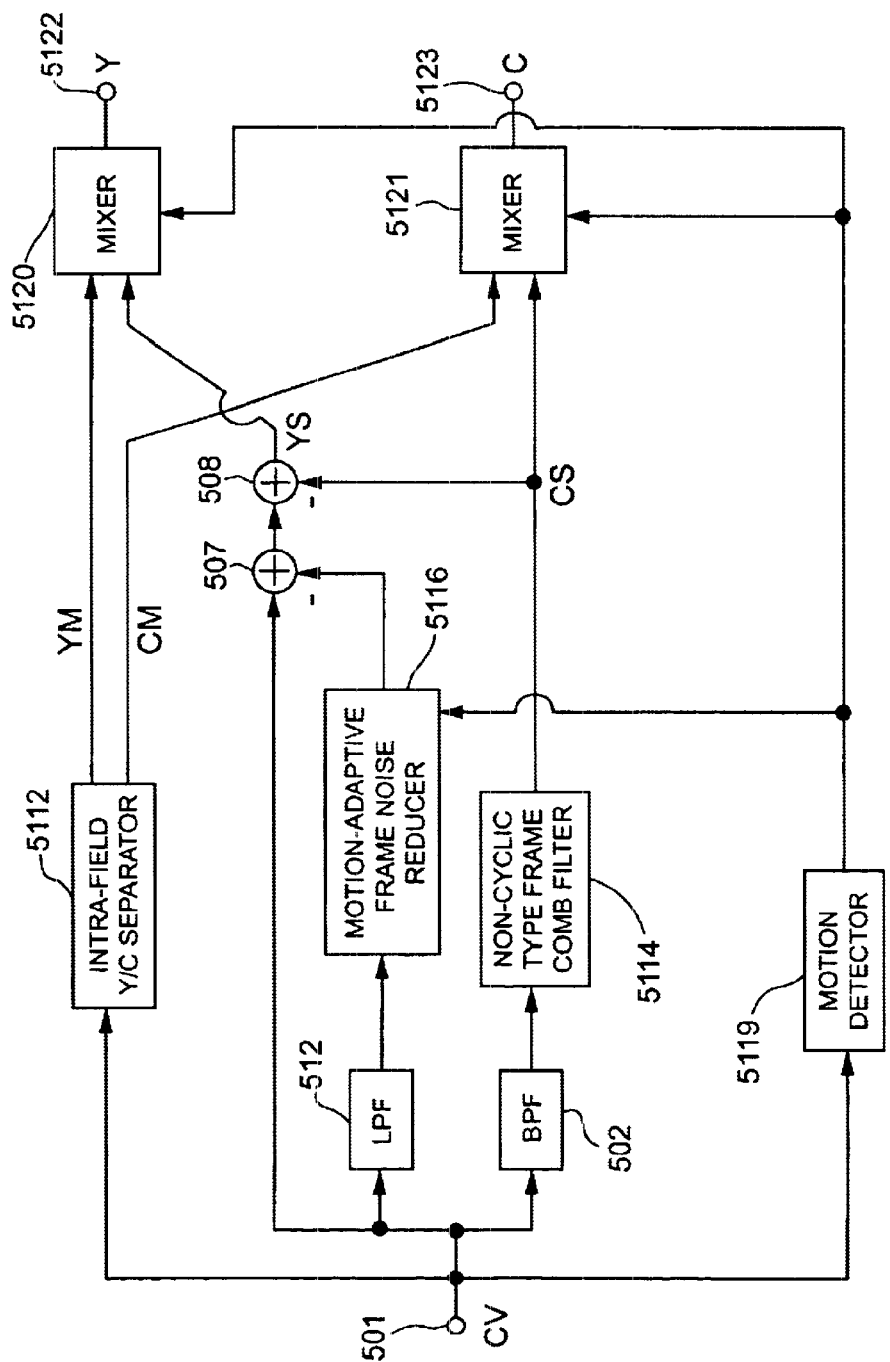
FIG. 15 is a block diagram for explaining a eighth embodiment of the inter-frame non-correlation component removing circuit of the present invention.

Referring now to FIG. 15, an eighth embodiment of the inter-frame non-correlation component removing circuit according to the present invention will be described in detail. This eight embodiment intends not only to improve the S/N ratio in a reduction of the luminance signal in reception of still image signals. But also to suppress an affect caused in reception of signals other than the still image signals.

In FIG. 15, and A/D conversion processed video signals, for instance, a NTSC system composite video signal CV is input to the input terminal 501. First, in an intra-field Y/C separation circuit 5112, an intra-field Y/C separated luminances signal YM and a chrominance signal CM are separated from the composite video signal CV.

On the other hand, the BPF 502 extracts a color subcarrier band, as shown in FIG. 7, from the input composite video signal CV, as shown in FIG. 6. The output of the BPF 502 is supplied to a non-cyclic type frame comb filter 5114 comprised of the frame memory 503, the subtractor 504 and the multiplier 505, as shown in FIG. 11. The non-cyclic type frame comb filter 5114 carries out an inter-frame Y/C separation to yield a chrominance signal CS therefrom.

Further, the LPF 512 extracts the luminance signal low band component (DC to 1 MHz), as shown in FIG. 8, from the composite video signal CV, as shown in FIG. 6. The output of the LPF 512 is supplied to a motion-adaptive cyclic type frame noise reducer 5116 comprised of the frame memory 513, the subtractors 520, 521, the limiter 522 and the motion detector 524. Thus the luminance signal low band noise components are obtained from the output of the motion-adaptive cyclic type frame noise reducer 5116. The luminance signal low band noise component is subtracted from the composite video signal CV in the subtractor 507. The output from the subtractor 507 is then supplied to the subtractor 508. The output from the subtractor 507 is then supplied to the subtractor 508. The subtractor 508 subtracts the chrominance signal CS obtained at the frame comb filter 5114 from the output of the subtractor 507. Thus the luminance signal YS is obtained at the output of the subtractor 508.

A motion detector 5119 generates a motion signal in proportion to the degree of image motions from the composite video signal CV, and then supplies the motion signal to the motion-adaptive cyclic type frame noise reducer 5116 and mixers 5120, 5121, respectively. The motion-adaptive cyclic type frame noise reducer 5116 acts to increase the improvement of the S/N ratio when there is no motion at all. While the noise reducer 5116 acts to decrease the improvement of the S/N ratio. Thus the noise reducer 5116 is able to prevent an affect of image signals (e.g., residual images).

The mixer 5120 mixes the intra-field Y/C separated luminance signal YM and the inter-frame Y/C separated luminance signal YS at the ratio defined by the motion signal supplied from the motion detector 5119. Thus a motion-adaptive Y/C processed luminance signal Y is produced from the mixer 5120. Also the mixer 5121 mixes the intra-field Y/C separated chrominance signal CM and the inter-frame Y/C separated chrominance signal CS at the ratio defined by the motion signal supplied from the motion detector 5119. Thus a motion-adaptive Y/C processed chrominance signal C is produced from the mixer 5121.

In the eighth embodiment, when a still image video signal is input, the mixer 5120 passes therethrough the 100% of the luminance signal YS obtained in the subtractor 508 as the luminance signal Y. As the motion-adaptive cyclic type frame noise reducer 5116 effects to improve the S/N ratio under the control of the motion detector 5119, the luminance signal Y with a high S/N ratio (improved by 8 dB in assumption of the a cyclic coefficient as 0.75) can be obtained at the output terminal 5122. Further, as the motion detector 5119 controls all of the motion-adaptive cyclic type frame noise reducer 5116 and the mixers 5120, 5121, it is able to largely reduce the coat of the whole system in compared to a case wherein each of the noise reducer 5116 and the mixers 5120, 5121 has a dedicated motion detector.

Figure 16:
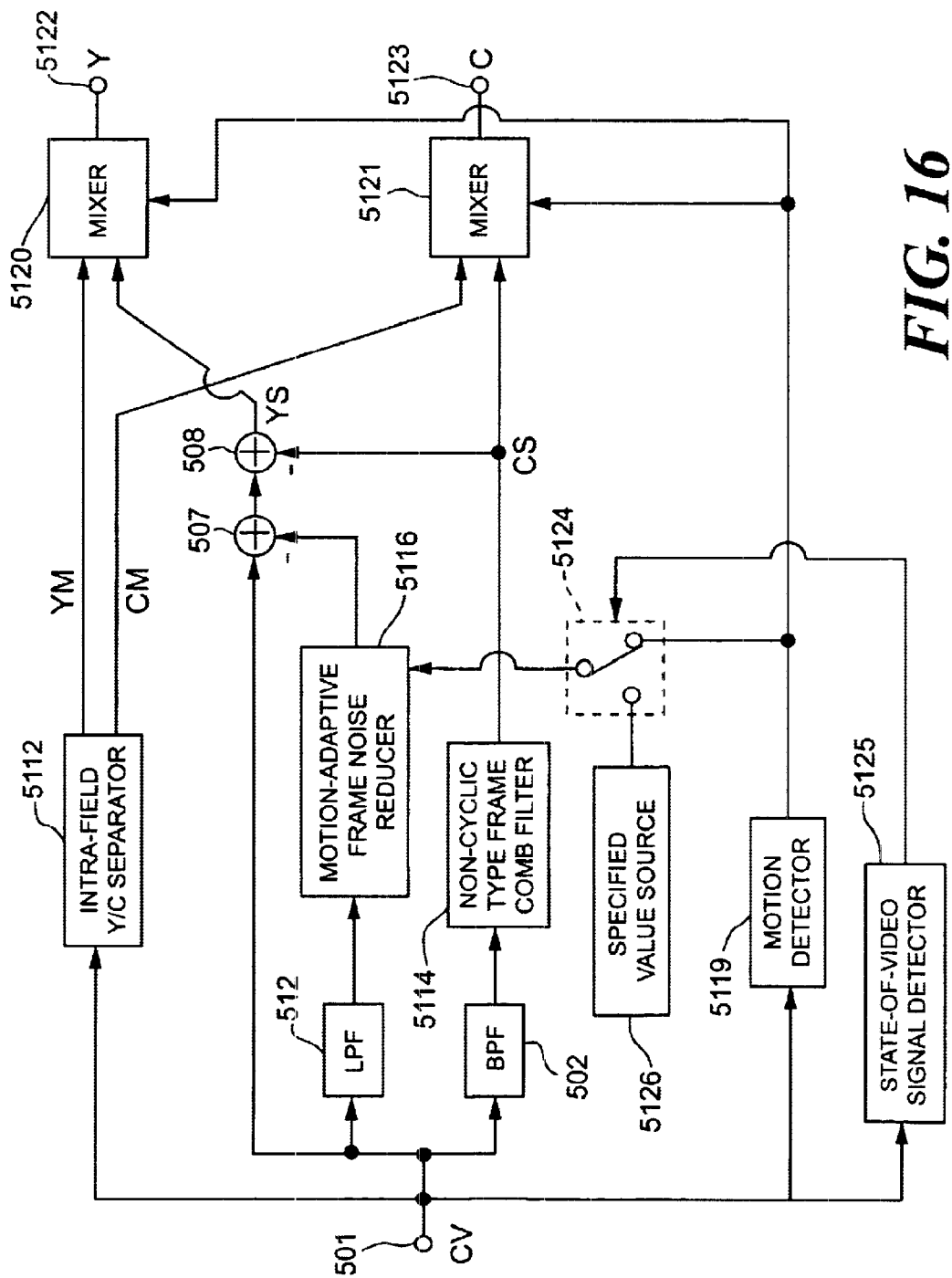
FIG. 16 is a block diagram for explaining a ninth embodiment of the inter-frame non-correlation component removing circuit of the present invention.

FIG. 16 shows a block diagram of a ninth embodiment of the inter-frame non-correlation component removing circuit according to the present invention. The same elements as those, as shown in FIG. 15, will be assigned with the same reference numerals and the detailed explanations thereof will be omitted hereinafter.

In this ninth embodiment, the output of the motion detector 5119 is supplied to the motion-adaptive cyclic type frame noise reducer 5116 via a selector 5124. The selector 5124 is controlled by a state-of-video signal detector 5125 for detecting a state of the video signal on the input terminal 501.

The state-of-video signal detector 5125 detects whether an abrupt image change such as a scene change or a program change such as a channel change has occurred or not for the input composite video signal CV. When the state-of-video signal detector 5125 detects that a scene change has occurred, the selector 5124 selects a specified value source 5126 which provides a specified value corresponding to the maximum level of the motion signal, and the supplies the specified value to the motion-adaptive cyclic type noise reducer 5116.

Accordingly, in the ninth embodiment, the motion-adaptive cyclic type frame noise reducer 5116 minimizes or deactivates the improvement of the S/N ratio according to the specified value to prevent an affect of deteriorating image quality due to that a cyclic type NR processing formerly applied for video signals at a certain time is improperly applied for other video signals after an abrupt change of video.

Figure 17:
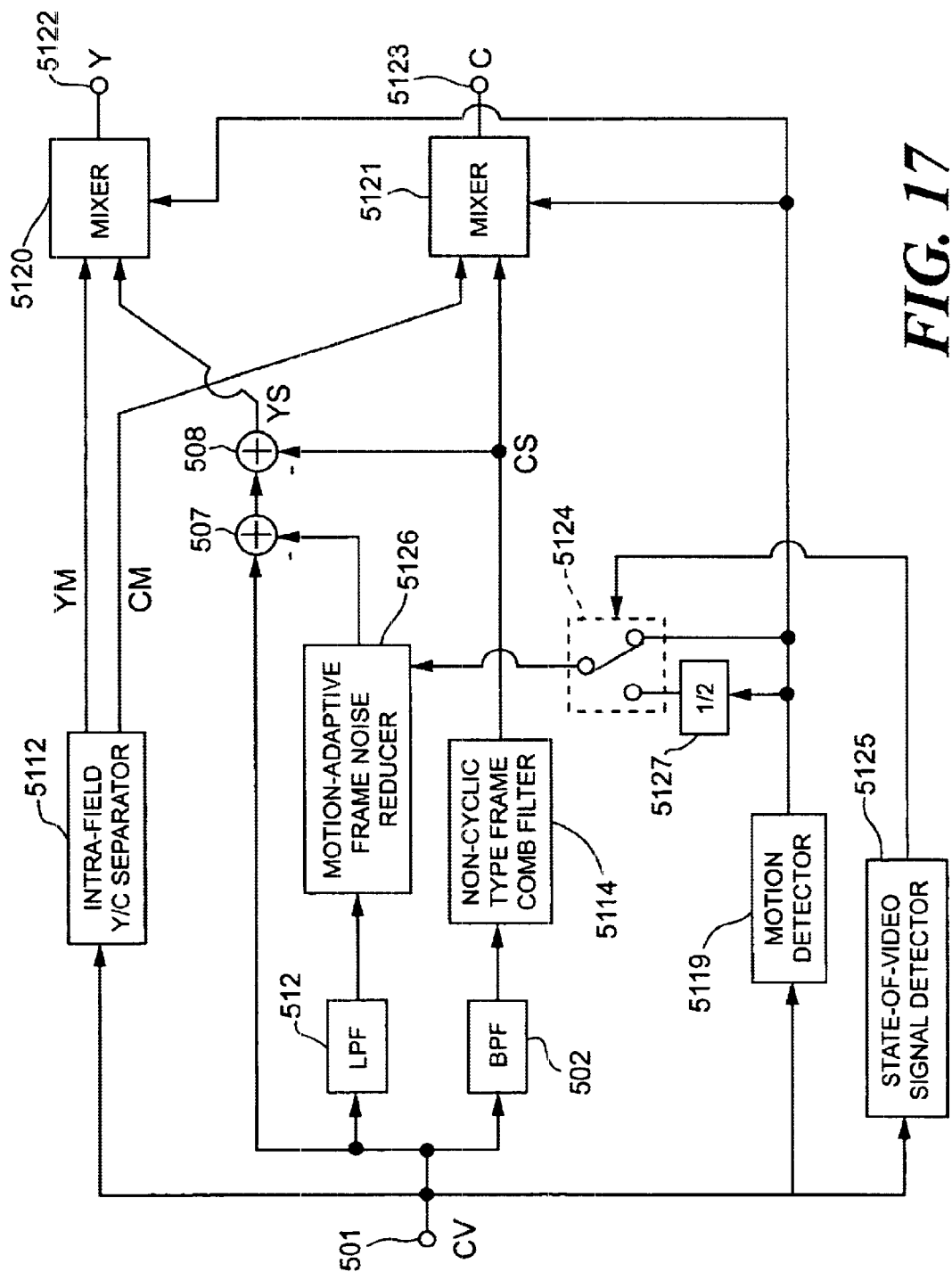
FIG. 17 is a block diagram for explaining a tenth embodiment of the inter-frame non-correlation component removing circuit of the present invention.

Referring now to FIG. 17, a tenth embodiment of the inter-frame non-correlation component removing circuit according to the present invention will be described in detail. In this tenth embodiment, a motion signal obtained at the motion detector 5119 and its ½ level-reduced signal processes at a level shifter 5127 are selectively supplied to the motion-adaptive cyclic type frame noise reducer 5116.

The state-of-video signal detector 5125 detects the S/N ratio of the composite video signal CV, and then determines whether a lesser electric field broadcast wave is received or not. When the state-of-video signal detector 5125 judges that a strong electric field broadcast wave is received, the selector 5124 passes the output of the motion detector 5119 directly to the motion-adaptive cyclic type frame noise reducer 5116. When detected a low S/N ratio in the state-of-video signal detector 5125 so that a reception of the lesser electric field broadcast wave is judged, the output of the motion detector 5119 is level-shifted by ½ at the level shifter 5127, and then supplied to the motion-adaptive cyclic type frame noise reducer 5116.

In this tenth embodiment, as the motion signal to be supplied to the motion-adaptive cyclic type frame noise reducer 5116 in reception of the lesser electric field broadcast wave is level-shifted by ½ than that in reception of a strong electric field broadcast wave, it is possible to obtain the luminance signal YS having improved S/N ratio at the output of the subtractor 508.

As described above, the present invention can provide an extremely preferable video signal processor.

That is, the video signal processor according to the present invention is able to achieve a luminance signal with a flat horizontal frequency characteristics without requirement of applying a complementary relationship between the LPF and the BPF. Thus the LPF and the BPF can be designed with a greater flexibility. Therefore, it is possible to prevent an increase of circuit scale and also to perform the frame Y/C separation by a low-cast system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A video signal processor, comprising:
   input means for selectively receiving either of a baseband video signal and a composite video signal are selectively input as an input video signal thereto;
   1H delay means for delaying the selected input video signal by one line period (1H);
   inter-line non-correlation component extraction means for extracting inter-line non-correlation components between the input video signal and the 1H delay signal from the 1H delay means;
   inter-frame non-correlation component removing means for removing inter-frame non-correlation components from the selected input video signal;
   first subtraction means responsive to the selection of the baseband video signal for subtracting the inter-line non-correlation component from the baseband video signal processed the inter-frame non-correlation component removal at the inter-frame non-correlation component removing means to result noise-reduced baseband video signals;
   second subtraction means responsive to the selection of the composite video signal the inter-line non-correlation component from the input composite video signal to result a first luminance signal; and
   mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

2. A video signal processor, comprising:
   input means for selectively receiving either of a baseband video signal and a composite video signal are selectively input as an input video signal thereto;
   1H delay means for delaying the selected input video signal by one line period (1H);
   2H delay means for delaying the selected input video signal by two line periods (2H);
   three-dimension inter-line non-correlation component extraction means for extracting three-dimension inter-line non-correlation components among the input video signal, the 1H delay signal from the 1H delay means and the 2H delay signal from the 2H delay means;
   inter-frame non-correlation component removing means for removing inter-frame non-correlation components from the selected input video signal;
   first subtraction means responsive to the selection of the baseband video signal for subtracting the three-dimension inter-line non-correlation component from the baseband video signal processed the inter-frame non-correlation component removal at the inter-frame non-correlation component removing means to result noise-reduced baseband video signals;
   second subtraction means responsive to the selection of the composite video signal the three-dimension inter-line non-correlation component from the input composite video signal to result a first luminance signal; and
   mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

3. A video signal processor, comprising:
   input means for selectively receiving either of a baseband video signal and a composite video signal are selectively input as an input video signal thereto;
   first band-pass filter (BPF) means for extracting a prescribed frequency band from the selected input video signal;
   1H delay means for delaying the selected input video signal by one line period (1H);
   second BPF means for extracting the prescribed frequency band from the 1H delay signal;
   inter-line non-correlation component extraction means for extracting inter-line non-correlation components between the input video signal from the first BPF means and the 1H delay signal from the second BPF means, each having the prescribed frequency band;
   inter-frame non-correlation component removing means for removing inter-frame non-correlation components from the selected input video signal;
   first subtraction means responsive to the selection of the baseband video signal for subtracting the inter-line non-correlation component from the baseband video signal processed the inter-frame non-correlation component removal at the inter-frame non-correlation component removing means to result noise-reduced baseband video signals;
   second subtraction means responsive to the selection of the composite video signal the inter-line non-correlation component from the input composite video signal to result a first luminance signal; and
   mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

4. A video signal processor, comprising:
   input means for selectively receiving either of a baseband video signal and a composite video signal are selectively input as an input video signal thereto;
   first band-pass filter (BPF) means for extracting a prescribed frequency band from the selected input video signal;
   1H delay means for delaying the selected input video signal by one line period (1H);
   second BPF means for extracting the prescribed frequency band from the 1H delay signal;
   2H delay means for delaying the selected input video signal by two line periods (2H);
   third BPF means for extracting the prescribed frequency band from the 2H delay signal;

three-dimension inter-line non-correlation component extraction means for extracting three-dimension inter-line non-correlation components among the input video signal from the first BPF means, the 1H delay signal from the second BPF means and the 2H delay signal from the third BPF means, each having the prescribed frequency band;

inter-frame non-correlation component removing means for removing inter-frame non-correlation components from the selected input video signal;

first subtraction means responsive to the selection of the baseband video signal for subtracting the inter-line non-correlation component from the baseband video signal processed the inter-frame non-correlation component removal at the inter-frame non-correlation component removing means to result noise-reduced baseband video signals;

second subtraction means responsive to the selection of the composite video signal the inter-line non-correlation component from the input composite video signal to result a first luminance signal; and mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

5. A video signal processor, comprising:

input means for selectively receiving either of a baseband video signal and a composite video signal are selectively input as an input video signal thereto;

first band-pass filter (BPF) means for extracting a first frequency band from the selected baseband video signal;

second BPF means for extracting a second frequency band from the selected composite video signal;

1H delay means for delaying the selected input video signal by one line period (1H);

third band-pass filter means for extracting the first frequency band from the baseband video signal from the 1H delay means;

fourth band-pass filter means for extracting the second frequency band from the composite video signal from the 1H delay means;

inter-line non-correlation component extraction means for extracting inter-line non-correlation components between a set of the baseband video signal from the first BPF means and the 1H delay baseband video signal from the third BPF means or another set of the composite video signal from the second BPF means and the 1H delay composite video signal from the fourth BPF means;

inter-frame non-correlation component removing means for removing inter-frame non-correlation components from the selected input video signal;

first subtraction means responsive to the selection of the baseband video signal for subtracting the inter-line non-correlation component from the baseband video signal processed the inter-frame non-correlation component removal at the inter-frame non-correlation component removing means to result noise-reduced baseband video signals;

second subtraction means responsive to the selection of the composite video signal the inter-line non-correlation component from the input composite video signal to result a first luminance signal; and mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

6. A video signal processor, comprising:

input means for selectively receiving either of a baseband video signal and a composite video signal are selectively input as an input video signal thereto;

first band-pass filter (BPF) means for extracting a first frequency band from the selected baseband video signal;

second BPF means for extracting a second frequency band from the selected composite video signal;

1H delay means for delaying the selected input video signal by one line period (1H);

third BPF means for extracting the first frequency band from the baseband video signal from the 1H delay means;

fourth BPF means for extracting the second frequency band from the composite video signal from the 1H delay means;

2H delay means for delaying the selected input video signal by two line periods (2H);

fifth BPF means for extracting the first frequency band from the baseband video signal from the 2H delay means;

sixth BPF means for extracting the second frequency band from the composite video signal from the 2H delay means;

three-dimension inter-line non-correlation component extraction means for extracting three-dimension inter-line non-correlation components among a set of the baseband video signal from the first BPF means, the 1H delay baseband video signal from the third BPF means and the 2H delay baseband baseband signal from the fifth BPF means or another set of the composite video signal from the second BPF means, the 1H delay composite video signal from the fourth BPF means and the 2H delay composite video signal from the sixth BPF means;

inter-frame non-correlation component removing means for removing inter-frame non-correlation components from the selected input video signal;

first subtraction means responsive to the selection of the baseband video signal for subtracting the inter-line non-correlation component from the baseband video signal processed the inter-frame non-correlation component removal at the inter-frame non-correlation component removing means to result noise-reduced baseband video signals;

second subtraction means responsive to the selection of the composite video signal the inter-line non-correlation component from the input composite video signal to result a first luminance signal; and mixing means for mixing a second luminance signal resulted from the inter-frame non-correlation component removal at the inter-frame non-correlation component removing means with the first luminance signal from the second subtraction means at a ratio defined by a motion signal to result a motion-adaptively processed luminance signal.

* * * * *